(12) United States Patent
Yokomitsu et al.

(10) Patent No.: US 8,018,494 B2
(45) Date of Patent: Sep. 13, 2011

(54) COLOR CORRECTION DEVICE, COLOR CORRECTION METHOD, DYNAMIC CAMERA COLOR CORRECTION DEVICE, AND VIDEO SEARCH DEVICE USING THE SAME

(75) Inventors: Sumio Yokomitsu, Kanagawa (JP); Hiromichi Sotodate, Kanagawa (JP); Hailin Yan, Singapore (SG); Chak Joo Lee, Singapore (SG)

(73) Assignee: Panasonic Corporation, Osaka (JP)

( * ) Notice: Subject to any disclaimer, the term of this patent is extended or adjusted under 35 U.S.C. 154(b) by 590 days.

(21) Appl. No.: 12/160,151

(22) PCT Filed: Jan. 5, 2007

(86) PCT No.: PCT/JP2007/050041
§ 371 (c)(1),
(2), (4) Date: Jul. 7, 2008

(87) PCT Pub. No.: WO2007/080834
PCT Pub. Date: Jul. 19, 2007

(65) Prior Publication Data
US 2009/0002517 A1   Jan. 1, 2009

(30) Foreign Application Priority Data
Jan. 10, 2006 (JP) .................. 2006-002625
Jan. 18, 2006 (JP) .................. 2006-009757

(51) Int. Cl.
*H04N 5/228* (2006.01)
*G06K 9/00* (2006.01)
(52) U.S. Cl. ................... 348/208.14; 382/103
(58) Field of Classification Search ............ 348/208.14, 348/143–160, 169–172, 222.1, 211.99, 211.9, 348/211.11; 382/103, 165
See application file for complete search history.

(56) References Cited

U.S. PATENT DOCUMENTS

| | | | |
|---|---|---|---|
| 4,779,095 A | 10/1988 | Guerreri | |
| 4,823,184 A | 4/1989 | Belmares-Sarabia et al. | |
| 4,912,770 A | 3/1990 | Seto et al. | |
| 2004/0239762 A1 | 12/2004 | Porikli et al. | |

FOREIGN PATENT DOCUMENTS

JP   11-186487   7/1999

(Continued)

OTHER PUBLICATIONS

European Search Report for 07706388.1 issued on Feb. 11, 2011.

(Continued)

*Primary Examiner* — Sinh Tran
*Assistant Examiner* — Mark Monk
(74) *Attorney, Agent, or Firm* — Pearne & Gordon LLP

(57) ABSTRACT

A color correction device (1) including: color set information storage portions (11) which store color set information inclusive of source colors and reference colors; region selection portions (6) which select specific source regions from source images picked up by two cameras 2 respectively; region color decision portions (7) which decide source region colors as colors representative of the source regions; color set update portions (10) which update source colors in color sets by using the source region colors; and color correction portions (8) which calibrate colors in ranges similar to the source colors in the two source images to reference colors by using the color sets. It is possible to eliminate the necessity of holding information of color sets unnecessary for color correction, so that it is possible to reduce the load imposed on calculation and adapt to a change of lighting environment in real time.

11 Claims, 43 Drawing Sheets

FOREIGN PATENT DOCUMENTS

| | | |
|---|---|---|
| JP | 2004-122653 | 4/2004 |
| JP | 2004-178272 | 6/2004 |
| JP | 2004-260305 | 6/2004 |
| JP | 2005-030801 | 2/2005 |

OTHER PUBLICATIONS

European Search Report for 10195138.2 issued on Feb. 8, 2011.
Kim K. et al, "Real-time foreground-background segmentation using codebook model", Real-time Imaging, Academic Press Limited, GB, vol. 11 No. 3, Jun. 1, 2005, pp. 172-185.
Raja Y. et al, "Tracking and segmenting people in varying lighting conditions using colour", Automatic Face and Gesture Recognition, 1998. Proceedings. Third IEEE International Conference on Nara, Japan Apr. 14-16, 1998, Los Alamitos, CA, USA, IEEE Comput. SOC, US, Apr. 14, 1998, pp. 228-233.
Bhandarkar S. M. et al, "Fast and Robust Background Updating for Real-time Traffic Surveillance and Monitoring", Computer Vision and Pattern Recognition, 2005 IEEE Computer Society Conference ON, IEEE, Piscataway, NJ, USA, Jun. 25, 2005, p. 55.
Shoushtarian B. et al, "A practical adaptive approach for dynamic background subtraction using an invariant colour model and object tracking", Pattern Recognition Letters, Elsevier, Amsterdam, NL, vol. 26 No. 1, Jan. 1, 2005, pp. 5-26.
Chin-Hao Hsu et al, "Region-Based Color Correction of Images", Information Technology and Applications, 2005. ICITA 2005. Third Inter National Conference on Sydney, Australia Jul. 4-7, 2005, Piscataway, NJ, USA, IEEE, vol. 1, Jul. 4, 2005, pp. 710-715.
Mathew Price, "Using colour features to classify objects and people in a video surveillance network", Mar. 31, 2004, Retrived from the Internet: http://www.dip.ee.uct.ac.za/publications/theses/MScMathew.pdf, Retrieved on Jan. 26, 2011.
International Search Report Dated Apr. 10, 2007.

Fig.6

Color Set Information

| Source Color A | | Source Color B | | Reference Color | |
|---|---|---|---|---|---|
| Color Information | Region Information | Color Information | Region Information | Color Information | |
| Gray 3 | - | Gray 2 | — | Gray 1 | Human Figure |
| Green 8 | Region 2b | Green 6 | Region 4e | Green 7 | Street Tree |
| Brown 2 | Region 2c | Brown 3 | Region 4f | Brown 4 | |
| Gray 5 | Region 7a | Gray 9 | Region 7c | Gray 7 | Road |
| ... | ... | ... | ... | ... | |

Fig.20

Reference Table

| Position | | Color | |
|---|---|---|---|
| X coordinate | Y coordinate | U | V |
| 0 | 0 | 128 | 128 |
| ⋮ | ⋮ | ⋮ | ⋮ |
| 220 | 70 | 180 | 150 |
| 220 | 71 | 180 | 150 |
| ⋮ | ⋮ | ⋮ | ⋮ |
| 719 | 478 | 201 | 16 |
| 719 | 479 | 189 | 46 |

COLOR CORRECTION DEVICE, COLOR CORRECTION METHOD, DYNAMIC CAMERA COLOR CORRECTION DEVICE, AND VIDEO SEARCH DEVICE USING THE SAME

TECHNICAL FIELD

The present invention (first invention) relates to a color correction device for applying color correction to images picked up by a plurality of image pickup devices and relates to a color correction device improved in adaptability to a change of lighting environment or the like. The present invention (second invention) relates to a dynamic camera color correction device for correcting an image picked up by a camera, and to a video search device using the dynamic camera color correction device.

BACKGROUND ART

With respect to the first invention, there is heretofore known a tracking and surveillance system which uses a computer for applying image processing to images picked up by a plurality of cameras to thereby track and supervise (surveille) an object such as a human figure or the like. In such a tracking and surveillance system, when characteristics, lighting environments, installation conditions, etc. of the cameras are different from one another, images of one and the same object (e.g. human figure or the like) picked up by the cameras respectively, especially colors of the object, are different in appearance in accordance with the cameras. Accordingly, in order to track an object with a plurality of cameras, it is necessary to associate one and the same object with colors which appears to be different in accordance with the plurality of cameras, that is, it is necessary to keep color constancy. In the tracking and surveillance system according to the background art, color information of an object is used for calibrating the color of the object between the plurality of cameras to thereby obtain consistency of one and the same object picked up by the plurality of cameras. Accordingly, accuracy in consistency of the object between the plurality of cameras is improved so that accuracy in tracking the object between the plurality of cameras is improved.

In such a tracking and surveillance system, when, for example, there is a change of lighting environment, it is necessary to update color information of the object in accordance with the change of lighting environment. As a method of detecting a change of lighting environment, there is heretofore known a method in which a deviation between corresponding pixels of two image regions is detected in order to detect an image change. For example, this method has been described in U.S. Pat. No. 4,779,095. As another method of detecting a change of lighting environment, there is also known a method in which video is stored to detect the beginning of a new scene so that detection of a scene change is achieved by use of a representative value of a video signal. For example, this method has been described in U.S. Pat. No. 4,823,184. As an another method of detecting a change of lighting environment, there is further known a method in which feature vectors of many images are generated on the basis of characteristics of the images respectively so that a scene change is detected when a value obtained by calculation of a difference between the vectors (a value having a feature of the object) varies in accordance with each image. For example, this method has been described in U.S. Pat. No. 4,912,770.

However, in the tracking and surveillance system according to the background art, when, for example, an object to be tracked is added, color information of the object is added correspondingly. In this case, even when color information of the same object as the newly added object has been already held, the color information of the object is added as the object is added. When the color information of the object unnecessary for color correction is added in this manner, the amount of color information of the object increases excessively. That is, since the amount of information used for color correction increases as the amount of color information of the object increases, the time required for color correction becomes so long that the operation of color correction becomes unstable.

Moreover, when lighting environment changes, the color information of the object which has been used up to now cannot be used so that the amount of unnecessary color information increases correspondingly. Moreover, when lighting environment changes, it is necessary to obtain new color information in accordance with the change of lighting environment. The background-art method of detecting a change of lighting environment is however unsuitable for real-time processing because the load imposed on calculation is very large.

With respect to the second invention, a device using color information of a human figure or an object is often used as a background-art device of tracking and searching for a human figure or an object by using a camera. When color information is used, there is a method in which a specific color pattern such as a color chart is once photographed by an installed camera in order to correct the individual difference between cameras and the influence of lighting environment so that a camera pattern is introduced individually. For example, such a technique has been described in JP-A-11-186487.

However, a surveillance system is frequently installed in any place regardless of indoor installation or outdoor installation. Particularly in outdoor installation, appearance of the color of an object to be supervised varies every moment in accordance with time, weather, etc. because of a dynamic change of sunlight, etc. For this reason, it is necessary to update dynamically the camera parameter which has been once introduced into the installed camera. Moreover, automatic update of the camera parameter is requisite in consideration of the number of installed cameras and the diversification of sunlight environment.

DISCLOSURE OF THE INVENTION

Problems to be Solved by the Invention

The present invention (first invention) has been accomplished under the aforementioned background. An object of the present invention (first invention) is to provide a color correction device which is so small in calculation load as to be adaptable to a change of lighting environment in real time.

The present invention (second invention) has been accomplished under the aforementioned background. An object of the present invention (second invention) is to provide a color correction device which can correct the color of an image appropriately without influence of a variation of image pickup environment such as camera installation environment, sunshine environment, etc., and to provide a video search device using the color correction device.

Means for Solving the Problems

According to an aspect of the present invention (first invention), there is provided a color correction device including:

color set information storage portion which stores color set information containing color information of a source color as a subject of color correction and color information of a reference color after color correction; color correction portion which corrects a color in a range similar to the source color, in each of source images picked up by a plurality of image pickup devices, to the reference color by using the color set; region selection portion which selects a specific source region from each of the source images; region color decision portion which decides a source region color as a representative color of the source region; and color set update portion which updates the source color of the color set by using the source region color.

According to another aspect of the invention (first invention), there is provided a color correction method including: storing color set information containing color information of a source color as a subject of color correction and color information of a reference color after color correction; selecting a specific source region from each of source images photographed by a plurality of image pickup devices; deciding a source region color as a representative color of the source region; updating the source color of the color set by using the source region color; and correcting a color in a range similar to the source color and in the plurality of source images to the reference color by using the color set.

According to an aspect of the invention (second invention), there is provided a dynamic camera color correction device for performing color correction of an image inputted from an image pickup portion picking up an image of a region to be supervised, comprising: a color complement portion which decides color correction parameters from a specific color chart; a color correction portion which performs color correction of the image picked up by the image pickup portion based on the color correction parameters and outputs a color-corrected image; a background extraction portion which extracts a background image from the color-corrected image; a background confirmation portion which confirms whether or not the background image is a background; a color extraction portion which extracts color information from the confirmed background image; and a color comparison portion which changes the color correction parameters when the extracted color information changes.

According to another aspect of the invention (second invention), there is provided a video search device including: the aforementioned dynamic camera color correction devices; motion region extraction portion which extracts a region moving in an image from a image corrected by the color correction portion; human figure discrimination portion which judges whether or not a human figure is contained in the region extracted by the motion region extraction portion and extracts a human figure region from the region; region division portion which divides the human figure region extracted by the human figure discrimination portion into blocks; representative color calculation portion which extracts color information and texture information from each of blocks divided by the region division portion; a database which accumulates color information and texture information extracted by the representative color calculation portion; a human figure search portion which compares color information and texture information of a human figure to be searched for by a user with color information and texture information accumulated in the database, and calculates score; and a search result display portion which displays the score calculated by the human figure search portion.

According to another aspect of the invention (second invention), there is provided a video search device including: the aforementioned dynamic camera color correction devices; motion region extraction portion which extracts a region moving in an image from a image corrected by the color correction portion; human figure discrimination portion which judges whether or not a human figure is contained in the region extracted by the motion region extraction portion and extracts a human figure region from the region; region division portion which divides the human figure region extracted by the human figure discrimination portion into blocks; representative color calculation portion which extracts color information and texture information from each of blocks divided by the region division portion; a database which accumulates color information and texture information extracted by the representative color calculation portion; a human figure search portion which compares color information and texture information of a human figure to be searched for by a user with color information and texture information accumulated in the database, calculates score, and sends a reproduction instruction to reproduce a image of a specific score; a compression portion which compresses the image corrected by the color correction portion in a predetermined compression method; a storage which stores the image compressed by the compression portion; an expansion portion which reads the image compressed by the compression portion and stored in the storage based on the reproduction instruction sent by the human figure search portion, and expands the image in a predetermined expansion method; and a display portion which displays the image expanded by the expansion portion.

According to another aspect of the invention (second invention), there is provided a video search device connected to a plurality of cameras, including: the aforementioned dynamic camera color correction devices; motion region extraction portion which extracts a region moving in an image from a image corrected by the color correction portion; human figure discrimination portion which judges whether or not a human figure is contained in the region extracted by the motion region extraction portion and extracts a human figure region from the region; region division portion which divides the human figure region extracted by the human figure discrimination portion into blocks; representative color calculation portion which extracts color information and texture information from each of blocks divided by the region division portion; a search human figure database in which color information and texture information of a specific human figure are stored; a human figure matching portion which compares color information and texture information calculated by the representative color calculation portion with color information and texture information stored in the search human figure database, and sends a camera changeover instruction to display a image of a human figure detected by the representative color calculation portion and corrected by the color correction portion when the two are of one and the same human figure; a video changeover portion which changes over to a camera to pick up the image corrected by the color correction portion based on the camera changeover instruction sent by the human figure matching portion; and a display portion which monitors and displays the image changed over by the video changeover portion and corrected by the color correction portion.

According to another aspect of the invention (second invention), there is provided a color correction device for performing color correction of an image inputted from an image pickup device picking up an image of a region to be supervised, based on color correction parameters, including: a background region extraction portion which extracts a background region in the image; a color information extraction portion which extracts color information of the background region; a color information comparison portion which compares the extracted color information with color information of the background region at an initial working operation, stored in a reference table; and a parameter change portion which changes the color correction parameters based on a result of the comparison.

As described below, there are other aspects of the invention. Accordingly, the disclosure of the invention is intended to provide part of aspects of the invention but not intended to limit the scope of the invention described and claimed here.

BRIEF DESCRIPTION OF THE DRAWINGS

FIG. 6 is a table for explaining color set information in an embodiment of the invention.

FIG. 20 is an example of a reference table in the dynamic camera color correction device according to the first embodiment of the invention.

DESCRIPTION OF THE REFERENCE NUMERALS

Figure 1:
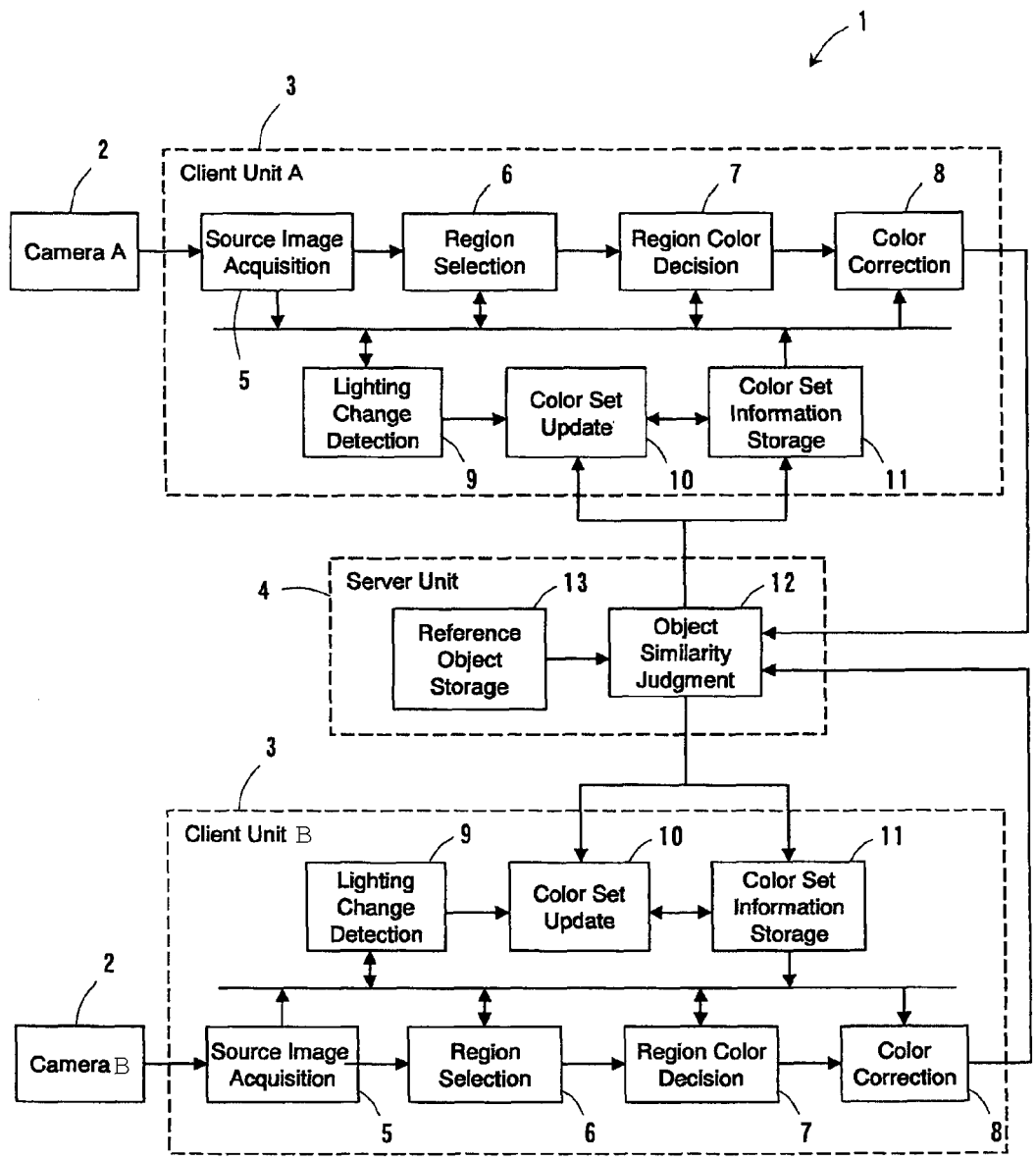
FIG. 1 is a block diagram of a color correction device in an embodiment of the invention (first invention).

1 color correction device
2 camera
5 source image acquisition portion
6 region selection portion (region selection unit)
7 region color decision portion (region color decision unit)
8 color correction portion (color correction unit)
9 lighting change detection portion (lighting change detection unit)
10 color set update portion (color set update unit)
11 color set information storage portion (color set information storage unit)
12 object similarity judgment portion (object similarity judgment unit)
13 reference object storage portion
14 source object extraction portion (source object extraction unit)
15 background image acquisition portion (background image acquisition unit)
16 corresponding region search portion (corresponding region search unit)
17 object color decision portion (object color decision unit)
18 corresponding region color decision portion (corresponding region color decision unit)
21 region division portion (region division unit)
24 feature amount acquisition portion
25 feature amount similarity judgment portion
29 color distance calculation portion
30 lighting change judgment portion
35 weighted calculation portion
100, 700, 1000, 1300, 1700 dynamic camera color correction device
2000 surveillance device
110 camera
120 color correction portion
121, 1321 background extraction portion
122, 1322 background confirmation portion
123 color extraction portion
124 reference table
125 color comparison portion
126, 726 color complement portion
1027 update timing judgment portion
1328, 1329 buffer
1730 background change confirmation portion
2031 motion region extraction portion
2032 human figure discrimination portion
2033 region division portion
2034 representative color calculation portion
2035 DB
2036, 2436 human figure search portion
2037 search result display portion
2038 keyboard and mouse
2439 compression portion
2440 storage
2441 expansion portion
2442 display portion
2743 human figure matching portion
2744 search human figure DB
2745 video changeover portion
200 an example of color chart
210 theoretical UV color space
211 an example of UV values in color chart
220 UV color space after photographing with camera
221 an example of UV values in color chart after photographing with camera
400 color chart image after photographing with camera
401 color correction block
402 color chart image after color correction
800, 810 UV color space after photographing with camera
801, 811 an example of UV values in background color after photographing with camera

BEST MODE FOR CARRYING OUT THE INVENTION

The present invention will be described below in detail. Incidentally, the following detailed description and accompanying drawings do not limit the invention. The scope of the invention is defined by the scope of accompanying claims instead.

A color correction device according to the invention (first invention) is configured to include: color set information storage portions each of which stores color set information containing color information of a source color as a subject of color correction and color information of a reference color after color correction; color correction portions each of which corrects a color in a range similar to the source color, in each of source images picked up by a plurality of image pickup devices, to the reference color by using the color set; region selection portions each of which selects a specific source region from each of the source images; region color decision portions each of which decides a source region color as a representative color of the source region; and color set update portions each of which updates the source color of the color set by using the source region color.

According to this configuration, a source color of a color set is replaced with a source region color of a source region so as to be updated. Accordingly, even when an object to be traced is added or when there is a change in lighting environment, information unnecessary for color correction need not be held. Hence, the quantity of information held for color correction can be reduced so that the load imposed on calculation can be reduced. Accordingly, the time required for color correction is shortened so that the operation of color correction becomes stable. Further, because the load on calculation is small, it is possible to adapt to a change of lighting environment in real time.

The color correction device according to the invention may be configured as follows: each of the region selection portions has a source object extraction portion which extracts a foreground object (e.g. a human figure, etc.) moving in a background image as a source object from the source images; each of the region color decision portions has an object color decision portion which decides an average color of the source object as an object color which is the source region color; the color correction device further includes an object similarity judgment portion which judges whether or not the source object is similar to a predetermined reference object; and each of the color set update portions updates the source color of the color set by using the object color of the source object when a judgment is made that the source object is similar to the reference object.

According to this configuration, even when an object to be traced is added, a source color of a color set can be updated by use of an object color of a source object (an average color of a source object) when the source object is similar to the reference object, so that color set information unnecessary for color correction need not be held. Hence, the quantity of information held for color correction can be reduced so that the load imposed on calculation can be reduced.

The color correction device according to the invention may be configured as follows: the object similarity judgment portion compares feature amounts (amounts of characteristic) of the source object and the reference object to thereby judge similarity between the source object and the reference object.

According to this configuration, the similarity of objects can be judged from feature amounts (e.g. moving velocity, size, aspect ratio, etc.) of a source object and a reference object, so that it is possible to improve accuracy in correspondence between the source object and the reference object and improve accuracy in tracking the source object.

The color correction device according to the invention may be configured as follows: each of the color set update portions uses a weighted average color obtained by a process of weighted-averaging the object color of the source object and the source color of the color set, as a source color for updating.

According to this configuration, even when a color difference between an object color of a source object and a source color of a color set is large, the degree of weighting can be adjusted to thereby adjust the source color for updating.

The color correction device according to the invention may be configured as follows: color set information containing region information from which color information of the source color is acquired is stored in each of the color set information storage portions; each of the region selection portions has a background image acquisition portion which acquires a background image from the plurality of source images, and a corresponding region search portion which searches the background image for a corresponding region (e.g. a street tree, a road, etc.) corresponding to the region information of the source color; each of the region color decision portions has a corresponding region color decision portion which decides an average color of the corresponding region as a corresponding region color which is the source region color; the color correction device further includes a lighting change detection portion which detects a change of lighting environment in the source image based on the corresponding region color; and each of the color set update portions updates the source color of the color set by using the corresponding region color when a judgment is made that there is a change in lighting environment.

According to this configuration, even when there is a change in lighting environment, a source color of a color set is updated by use of a corresponding region color when a judgment is made that there is a change in lighting environment, so that color set information unnecessary for color correction need not be held. Hence, the quantity of information held for color correction can be reduced so that the load imposed on calculation can be reduced.

The color correction device according to the invention may be configured as follows: each of the lighting change detection portions has: a color distance calculation portion which calculates a color distance between the corresponding region color and the source color; and a lighting change judgment portion which judges that there is a change in lighting environment when the color distance between the corresponding region color and the source color is larger than a predetermined threshold color distance.

According to this configuration, whether or not there is a change in lighting environment can be judged by use of a color distance between a corresponding region color and a source color (a distance between two color coordinates in a color space), so that it is possible to reduce the load imposed on calculation and improve adaptability to a change of lighting environment or the like compared with the lighting environment change detection method according to the background art.

The color correction device according to the invention may be configured as follows: each of the background image acquisition portions acquires the background image from the plurality of source images at intervals of a predetermined time; and each of the lighting change detection portions detects a change of lighting environment in the source image at intervals of the predetermined time.

According to this configuration, a background image is acquired from a source image at intervals of a predetermined time so that a change of lighting environment is detected. Accordingly, by adjusting the predetermined time interval in accordance with the frequency in change of lighting environment, the frequency in calculation for detecting a change of lighting environment can be adjusted so that the load imposed on calculation can be reduced compared with the case where a change of lighting environment is always detected.

The color correction device according to the invention may be configured as follows: each of the color correction portions has a region division portion which divides the corresponding region into a plurality of small regions; and the source color of the color set is updated by using the corresponding region color in accordance with each of the small regions.

According to this configuration, when a corresponding region (e.g. street tree) is composed of a plurality of small regions (e.g. a leaf portion and a trunk portion) having different colors respectively, a source color can be updated by use of a corresponding region color in accordance with each of the small regions, so that accuracy in correspondence of the corresponding region is improved.

A color correction method according to the invention includes the steps of: storing color set information containing color information of a source color as a subject of color correction and color information of a reference color after color correction; selecting a specific source region from each of source images photographed by a plurality of image pickup devices; deciding a source region color as a representative color of the source region; updating the source color of the color set by using the source region color; and correcting a color in a range similar to the source color and in the plurality of source images to the reference color by using the color set.

The color correction method according to the invention may further include the steps of: extracting a foreground object moving in a background image as a source object from the source image; deciding an average color of the source object as an object color which is the source region color; judging whether or not the source object is similar to a predetermined reference object; and updating the source color of the color set by using the object color of the source object when a judgment is made that the source object is similar to the reference object.

The color correction method according to the invention may further include the steps of: storing color set information containing region information from which color information of the source color is acquired; acquiring a background image from the plurality of source images; searching the background image for a corresponding region corresponding to region information of the source color; deciding an average color of the corresponding region as a corresponding region color which is the source region color; detecting a change of lighting environment in the source image based on the corresponding region color; and updating the source color of the color set by using the corresponding region color when a judgment is made that there is a change in lighting environment.

According to the invention (first invention), color set update portions each of which updates a source color of a color set by using a source region color are provided to thereby eliminate the necessity of holding color set information unnecessary for color correction so that it is possible to reduce the load imposed on calculation and adapt to a change of lighting environment in real time.

A dynamic camera color correction device according to the invention (second invention) is a camera color correction device for performing color correction of an image inputted from an image pickup portion picking up an image of a region to be supervised, configured to include: a color complement portion which decides color correction parameters from a specific color chart; a color correction portion which performs color correction of the image picked up by the image pickup portion based on the color correction parameters and outputs a color-corrected image; a background extraction portion which extracts a background image from the color-corrected image; a background confirmation portion which confirms whether or not the background image is a background; a color extraction portion which extracts color information from the confirmed background image; and a color comparison portion which changes the color correction parameters when the extracted color information changes.

According to this configuration, color correction of a photograph image can be performed automatically regardless of a change of photograph environment of the image pickup portion by a method in which: a background image in a region to be supervised is extracted; a change of the color of the background image is confirmed; and color correction parameters are updated successively.

The dynamic camera color correction device according to the invention may be configured to further include a reference table which stores the color information of the background image while associating the color information of the background image with position information of the background image.

The dynamic camera color correction device according to the invention may be configured as follows: the color correction portion updates color correction parameters of an entire color space based on the color correction parameters changed by the color comparison portion.

According to this configuration, color correction can be made with higher accuracy by a method in which: the color complement portion performs color complement by using changed background pixel colors; and color correction parameters are updated entirely.

The dynamic camera color correction device according to the invention may be configured to further include an update timing judgment portion which detects pixel information of the background image and judges whether or not the color comparison portion should be worked, in accordance with a difference between the pixel information of the background image and pixel information as a reference.

According to this configuration, the timing for color comparison can be found.

The dynamic camera color correction device according to the invention may be configured as follows: the update timing judgment portion divides the background image into predetermined regions and calculates an average of luminance values in each of the regions.

According to this configuration, the processing load imposed on a CPU or DSP for performing color correction can be reduced in such a manner that color correction parameters are updated based on the update timing judgment portion only when a change of sunshine occurs frequently compared with that at the initial working operation.

The dynamic camera color correction device according to the invention may be configured to further include first and second buffers which store the image corrected by the color correction portion, wherein: the background extraction portion extracts a group 1 of background images from the image stored in the first buffer; the background confirmation portion extracts a group 2 of background images from the image stored in the second buffer; and the color comparison portion detects pixel information of the background image group 1 and the background image group 2 and performs the color comparison based on a change in pixel information of the background image group 1 and the background image group 2.

The dynamic camera color correction device according to the invention may be configured as follows: the background extraction portion generates a histogram in accordance with each of pixels in the image stored in the first buffer in time series and extracts high-frequency luminance; and the background confirmation portion generates a histogram in accordance with each of pixels in the image stored in the second buffer in time series and extracts high-frequency luminance.

According to this configuration, a plurality of background pixels can be extracted by the background extraction portion and the background confirmation portion so that color correction can be made with high accuracy even when shaking of leaves, a flag or the like occurs.

The dynamic camera color correction device according to the invention may be configured to further include a background change confirmation portion which confirms whether or not an object in the background image confirmed by the background confirmation portion moves.

The dynamic camera color correction device according to the invention may be configured as follows: the background change confirmation portion calculates a difference between the background image in a current frame and the background image in a frame just previous to the current frame.

According to this configuration, the background change confirmation portion can compare the background image (group) in the current frame with the background image (group) in a frame just previous to the current frame so that color correction can be made with high accuracy even when a parked car or the like contained in the background image moves.

A video search device according to the invention is configured to include: the aforementioned dynamic camera color correction devices; motion region extraction portions each of which extracts a region moving in an image from a photograph image corrected by the color correction portion; human figure discrimination portions each of which judges whether or not a human figure is contained in the region extracted by the motion region extraction portion and extracts a human figure region from the region; region division portions each of which divides the human figure region extracted by the human figure discrimination portion into blocks; representative color calculation portions each of which extracts color information and texture information from each of block regions divided by the region division portion; a database which accumulates color information and texture information extracted by the representative color calculation portion; a human figure search portion which compares color information and texture information of a human figure to be searched for by a user with color information and texture information accumulated in the database and calculates score; and a search result display portion which displays the score calculated by the human figure search portion.

According to this configuration, color correction can be performed dynamically by the dynamic camera color correction device so that accurate human figure search can be made without influence of an individual difference between cameras, a change of sunshine, etc.

A video search device according to the invention is configured to include: the aforementioned dynamic camera color correction devices; motion region extraction portions each of which extracts a region moving in an image from a photograph image corrected by the color correction portion; human figure discrimination portions each of which judges whether or not a human figure is contained in the region extracted by the motion region extraction portion and extracts a human figure region from the region; region division portions each of which divides the human figure region extracted by the human figure discrimination portion into blocks; representative color calculation portions each of which extracts color information and texture information from each of block regions divided by the region division portion; a database which accumulates color information and texture information extracted by the representative color calculation portion; a human figure search portion which compares color information and texture information of a human figure to be searched for by a user with color information and texture information accumulated in the database, calculates score and sends a reproduction instruction to reproduce a photograph image of a specific score; a compression portion which compresses the photograph image corrected by the color correction portion in a predetermined compression method; a storage which stores the photograph image compressed by the compression portion; an expansion portion which reads the photograph image, compressed by the compression portion and stored in the storage based on the reproduction instruction sent by the human figure search portion and expands the photograph image in a predetermined expansion method; and a display portion which displays the photograph image expanded by the expansion portion.

The video search device according to the invention may be configured as follows: the compression portion compresses any frame intermittently selected from the photograph image corrected by the color correction portion, in a predetermined compression method.

According to this configuration, video of a required human figure can be reproduced without influence of an individual difference between cameras, a change of sunshine, etc. by a method in which: color correction is performed dynamically by the dynamic camera color correction device; the color-corrected video is accumulated in the storage; and the video is displayed on the display portion.

Further, a video search device according to the invention is a video search device connected to a plurality of cameras, configured to include: the aforementioned dynamic camera color correction devices; motion region extraction portions each of which extracts a region moving in an image from a photograph image corrected by the color correction portion; human figure discrimination portions each of which judges whether or not a human figure is contained in the region extracted by the motion region extraction portion and extracts a human figure region from the region; region division portions each of which divides the human figure region extracted by the human figure discrimination portion into blocks; representative color calculation portions each of which extracts color information and texture information from each of block regions divided by the region division portion; a search human figure database in which color information and texture information of a specific human figure are stored; a human figure matching portion which compares color information and texture information calculated by the representative color calculation portion with color information and texture information stored in the search human figure database and sends a camera changeover instruction to display a photograph image of a human figure detected by the representative color calculation portion and corrected by the color correction portion when the two are of one and the same human figure; a video changeover portion which changes over to a camera to pick up the photograph image corrected by the color correction portion based on the camera changeover instruction sent by the human figure matching portion; and a display portion which monitors and displays the photograph image changed over by the video changeover portion and corrected by the color correction portion.

According to this configuration, even when a required human figure moves between cameras, the required human figure can be monitored without influence of an individual difference between cameras, a change of sunshine, etc. by a method in which: color correction is performed dynamically by the dynamic camera color correction device; comparison is made by the human figure matching portion as to whether or not the human figure is the same as a human figure stored in the search human figure DB in advance; and the camera is changed over by the video changeover portion when the human figure is the same as a human figure stored in the search human figure DB.

According to the invention (second invention), a background image in a region to be supervised is extracted automatically, a change of the color of the background image is confirmed and color correction parameters are updated successively, so that color correction of a photograph image can be made automatically regardless of a change of photograph environment of the image pickup portion.

EMBODIMENT OF THE FIRST INVENTION

A color correction device according to an embodiment of the present invention (first invention) will be described below with reference to FIGS. 1 to 9. In this embodiment, as shown in FIG. 2, there is illustrated the case of a color correction device used in a tracking and surveillance system for applying image processing to two camera images picked up by two cameras by using a computer to thereby track and supervise an object (e.g., a human figure or the like) moving on the two camera images.

In the following description, the two cameras are referred to as camera A and camera B. The image picked up by the camera A is referred to as source image A whereas the image picked up by the camera B is referred to as source image B. In this embodiment, the cameras A and B are disposed in positions far from each other (see FIG. 2). A human figure which is an object to be supervised moves on the source image A of the camera A and on the source image B of the camera B.

Figure 2:
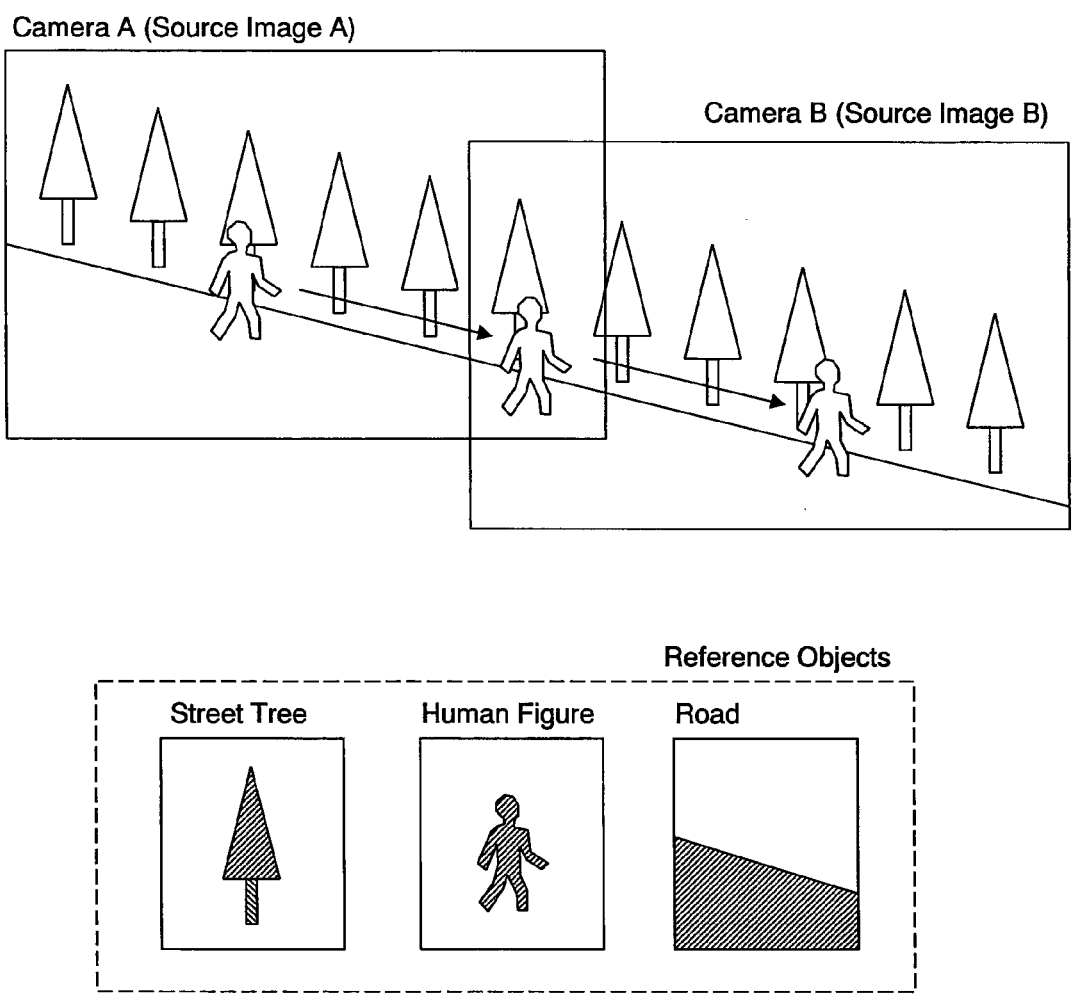
FIG. 2 is a schematic view for explaining a camera image in an embodiment of the invention.

A block diagram of the color correction device according to the embodiment of the invention is shown in FIG. 1. As shown in FIG. 1, a color correction device 1 includes two client units 3 (client unit A and client unit B) put in supervisory places where two cameras 2 (camera A and camera B) are set, and one server unit 4 put in a central supervisory place.

As shown in FIG. 1, each client unit 3 includes a source image acquisition portion 5, a region selection portion 6, a region color decision portion 7, a color correction portion 8, a lighting change detection portion 9, a color set update portion 10, and a color set information storage portion 11. The server unit 4 includes an object similarity judgment portion 12, and a reference object storage portion 13.

Each source image acquisition portion 5 acquires a source image (source image A or source image B) from the camera 2 (camera A or camera B). In this embodiment, the acquisition of the source image is performed in the source image acquisition portion 5 at intervals of a predetermined frame rate which is set in advance (e.g. at intervals of 1 second or at intervals of 5 seconds).

Figure 3:
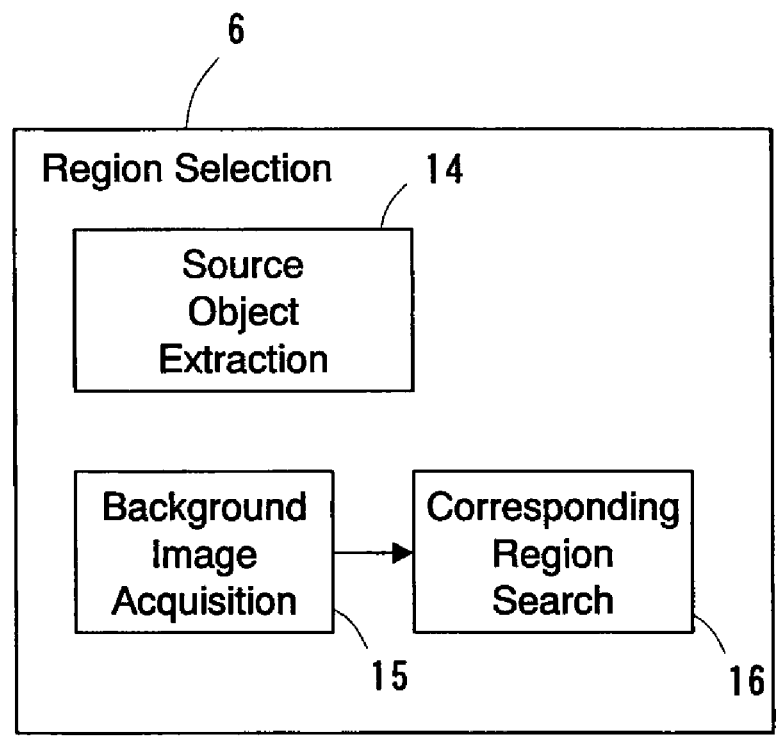
FIG. 3 is a block diagram of a region selection portion in an embodiment of the invention.

FIG. 3 is a block diagram showing the configuration of each region selection portion 6. As shown in FIG. 3, each region selection portion 6 includes a source object extraction portion 14 which extracts a foreground object moving in a background image as a source object from the source image. The region selection portion 6 further includes a background image acquisition portion 15 which acquires a background image from the source image after extraction of the source object, and a corresponding region search portion 16 which searches the background image for a corresponding region corresponding to region information of the source color in a color set which will be described later. In this embodiment, the acquisition of the background image is performed at regular time intervals (e.g. at intervals of 1 minute or at intervals of 5 minutes). The region selection portion 6 is configured thus so that a specific source region (a source object or a region corresponding to the background image) can be selected from the source image.

Figure 4:
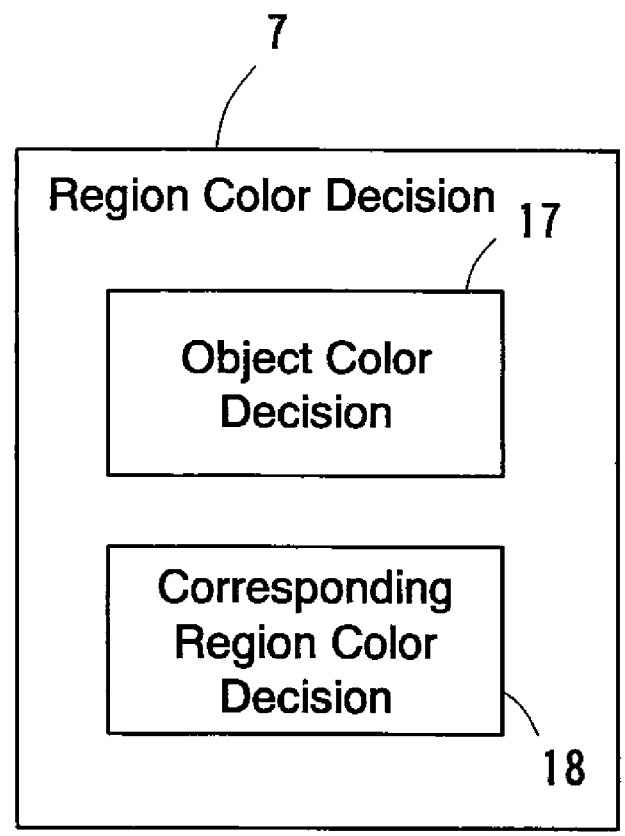
FIG. 4 is a block diagram of a region color decision portion in an embodiment of the invention.

FIG. 4 is a block diagram showing the configuration of each region color decision portion 7. As shown in FIG. 4, each region color decision portion 7 includes an object color decision portion 17 which calculates an average color of the source object and decides the average color as an object color. When, for example, the source object has various colors, the average color of the source object has gray scale color information corresponding to luminance. Or the average color of the source object may have color information including average colors of RGB color information. The region color decision portion 7 further includes a corresponding region color decision portion 18 which calculates an average color of a corresponding region and decides the average color as a corresponding region color. When, for example, the corresponding region has a nearly uniform color, the average color of the corresponding region has color information of a central color representative of the nearly uniform color. That is, the average color of the corresponding region can be said to be a representative color of the corresponding region. Besides the average color of the corresponding region, for example, the modal value (most frequently used color) of colors contained in the corresponding region may be used as the representative color of the corresponding region. The region color decision portion 7 is configured thus so that a source region color (a source object color or a corresponding region color) can be decided as a color representative of the source region (a source object or a corresponding region).

Figure 5:
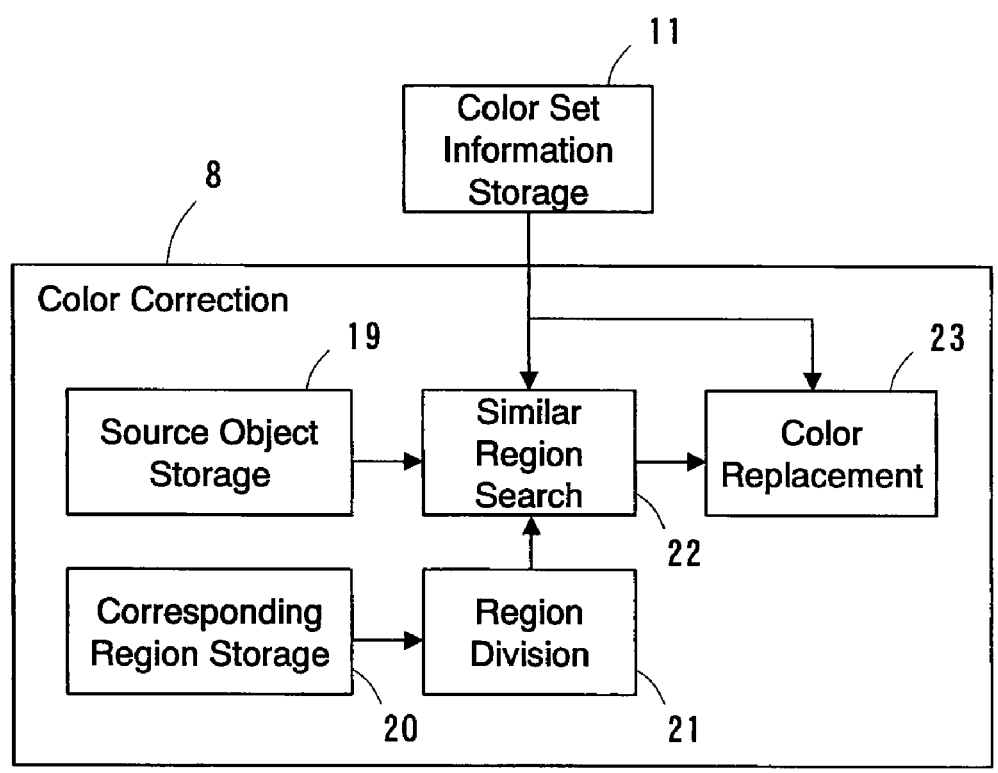
FIG. 5 is a block diagram of a color correction portion in an embodiment of the invention.

FIG. 5 is a block diagram showing the configuration of each color correction portion 8. As shown in FIG. 5, each color correction portion 8 includes a source object storage portion 19 which stores object information of a source object (color information, positional information, etc. of an object). The color correction portion 8 further includes a corresponding region storage portion 20 which stores corresponding region information of a corresponding region (color information, positional information, etc. of a corresponding region), and a region division portion 21 which divides the corresponding region into a plurality of small regions. The color correction portion 8 further includes a similar region search portion 22 which searches a specific source region (a source object, a corresponding region or a small region) of the source image for regions having colors in a range similar to the source color, and a region color replacement portion 23 which replaces the color of each searched region with a reference color in a color set which will be described later. The color correction portion 8 is configured thus so that colors in a range similar to the source color in the source image (source image A or source image B) can be calibrated to a reference color by use of color set information stored in the color set information storage portion 11.

For example, color set information as shown in FIG. 6 is stored in the color set information storage portion 11. The color set information contains color information of the source color which is a subject of color correction, region information indicating original regions from which color information of the source color is acquired, and color information of the reference color used for color correction.

In this embodiment, for example, color information (gray 3 or gray 2) of a gray scale source color is stored as color set information acquired from a source object (e.g. human figure) in a source image (source image A or source image B) as shown in FIG. 2. For example, color information (gray 1) of a reference color is acquired from a reference object of the human figure stored in the reference object storage portion 13. Incidentally, in this case, region information of the source color is not stored as color set information because the source object (e.g. human figure) moves in the source image and does not always stand still in a constant region.

In this embodiment, for example, both color information (green 8 or green 6) and region information (2b or 4e) of a green source color are stored as color set information acquired from a small region (e.g. a leaf portion of a street tree) in a corresponding region of a background image in the source image (source image A or source image B) shown in FIG. 2. For example, color information (green 7) of a reference color is acquired from the leaf portion of a reference object of the street tree stored in the reference object storage portion 13. Both color information (brown 2 or brown 3) and region information (2c or 4f) of a brown source color are stored as color set information acquired from a small region (e.g. a trunk portion of a street tree) of a corresponding region of the background image. For example, color information (brown 4) of a reference color is acquired from the trunk portion of a reference object of the street tree stored in the reference object storage portion 13.

Figure 7:
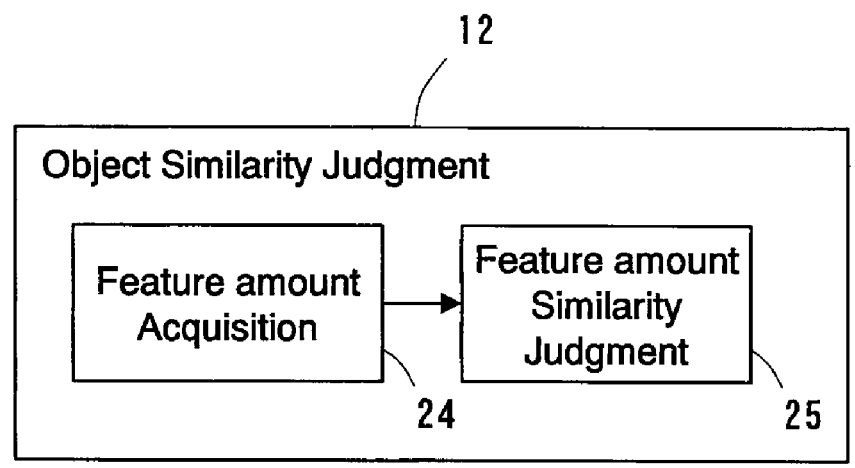
FIG. 7 is a block diagram of an object similarity judgment portion in an embodiment of the invention.

FIG. 7 is a block diagram showing the configuration of the object similarity judgment portion 12. As shown in FIG. 7, the object similarity judgment portion 12 includes a feature amount acquisition portion 24, and a feature amount similarity judgment portion 25. The feature amount acquisition portion 24 acquires feature amount of a source object from the source object storage portion 19 of the color correction portion 8 and acquires feature amount of a reference object from the reference object storage portion 13. For example, reference objects are exemplified in FIG. 2. In this embodiment, for example, objects such as a street tree, a human figure, a road, etc. are used as reference objects. For example, feature amount such as a moving velocity, a size, an aspect ratio, etc. of an object is used as feature amount of an object. The feature amount similarity judgment portion 25 compares feature amount of a source object with feature amount of a reference object to thereby judge similarity between the source object and the reference object. The object similarity judgment portion 12 is configured thus so that whether or not a source object is similar to a reference object can be judged.

Figure 8:
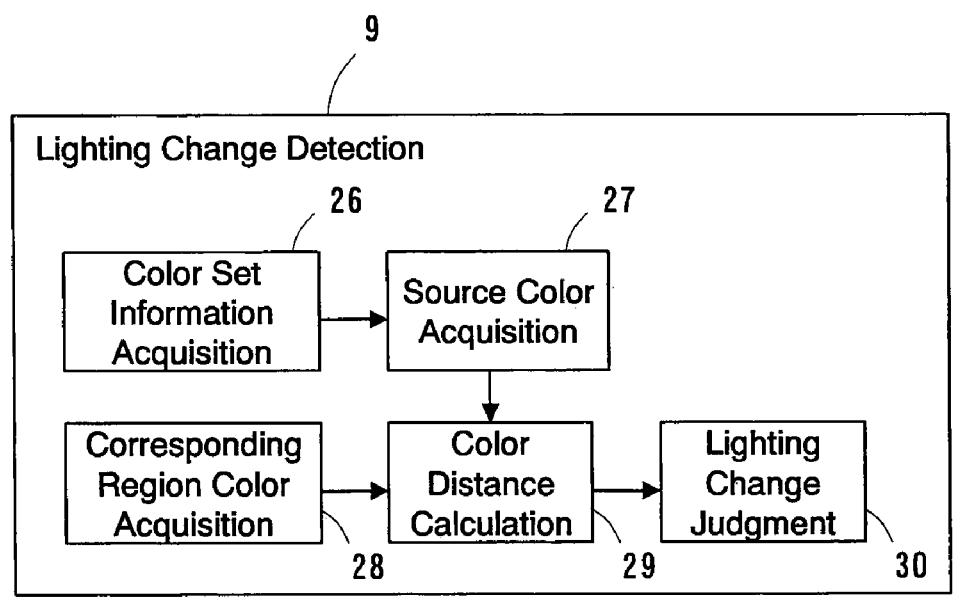
FIG. 8 is a block diagram of a lighting change detection portion in an embodiment of the invention.

FIG. 8 is a block diagram showing the configuration of each lighting change detection portion 9. As shown in FIG. 8, the lighting change detection portion 9 includes a color set information acquisition portion 26 which acquires color set information from the color set information storage portion 11, and a source color acquisition portion 27 which acquires a source color corresponding to a corresponding region (or a small region) from the color set information (see FIG. 6). The lighting change detection portion 9 further includes a corresponding region color acquisition portion 28 which acquires color information (corresponding region color) of a corresponding region, a color distance calculation portion 29 which calculates a color distance D between the source color and the corresponding region color by using a comparison method such as a least squares method, and a lighting change judgment portion 30 which make a judgment that there is a change of lighting when the color distance D is larger than a predetermined threshold color distance Ds. The lighting change detection portion 9 is configured thus so that a change of lighting environment in the source image can be detected.

In this embodiment, for example, the color distance D between the source color and the corresponding region color is calculated in accordance with the following expression 1

$$D=\{(h1-h2)2+(s1-s2)2+(v1-v2)2\}0.5 \quad \text{(Expression 1)}$$

when (h1, s1, v1) are coordinates of the source color in an HSV color space, and (h2, s2, v2) are coordinates of the corresponding region color in the HSV color space.

Figure 9:
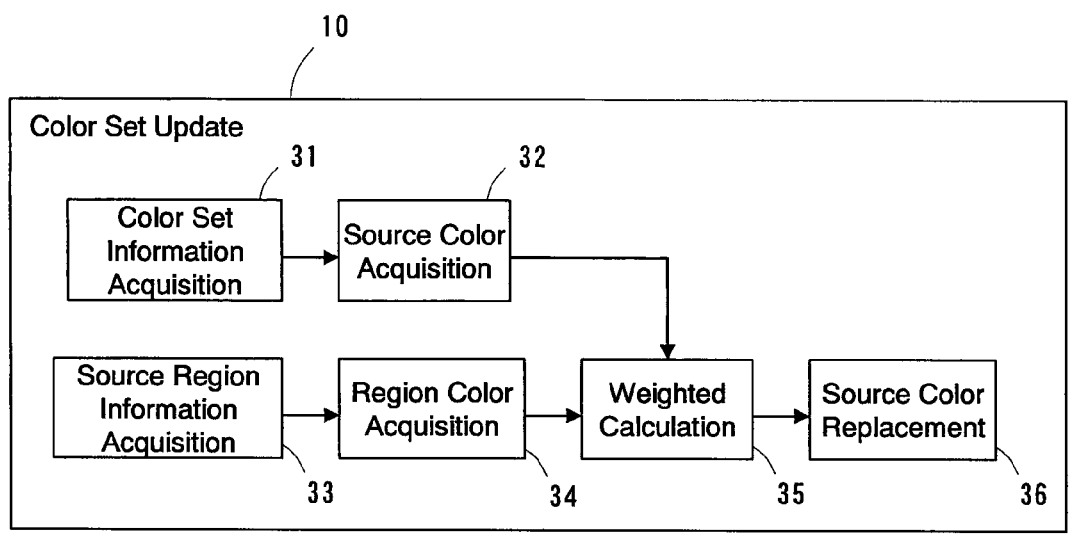
FIG. 9 is a block diagram of a color set update portion in an embodiment of the invention.

FIG. 9 is a block diagram showing the configuration of each color set update portion 10. As shown in FIG. 9, the color set update portion 10 includes a color set information acquisition portion 31, a source color acquisition portion 32, a source region information acquisition portion 33, a region color acquisition portion 34, a weighted calculation portion 35, and a source color replacement portion 36.

In the color set update portion 10, when a judgment is made that a source object is similar to a reference object, object information of the source object is acquired by the source region information acquisition portion 33 and an object color of the source object is acquired by the region color acquisition portion 34. Further, color set information is acquired by the color set information acquisition portion 31 and a source color corresponding to the source object is acquired by the source color acquisition portion 32. A process of calculating a weighted average of the object color and the source color is performed by the weighted calculation portion 35. The old source color before the weight average calculation process is replaced with a new source color after the weight average calculation process by the source color replacement portion 36. The color set update portion 10 is configured thus so that the source color in the color set can be updated automatically by use of the object color of the source object.

In this embodiment, in the weighted calculation portion 35, the process of calculating a weighted average of the object color and the source color is performed by use of the following expression 2

$$Cs'=(1-A)\times Cs+A\times Co \quad \text{(Expression 2)}$$

In which Cs is color information of the source color in the color set before the weighted average calculation process (before update), Co is color information of the object color, A is a weighting coefficient ($0 \leq A \leq 1$), and Cs' is color information of the source color in the color set (after update) obtained by the weighted average calculation process.

In the color set update portion 10, when a judgment is made that there is a change of lighting environment in the source image, corresponding region information of a corresponding region is acquired by the source region information acquisition portion 33 and a corresponding region color of the corresponding region is acquired by the region color acquisition portion 34. Further, color set information is acquired by the color set information acquisition portion 31 and a source color corresponding to the corresponding region is acquired by the source color acquisition portion 32. In the same manner as described above, a process of calculating a weighted average of the object color and the source color is performed by the weighted calculation portion 35 and the old source color before the weighted average calculation process is replaced with a new source color after the weighted average calculation process by the source color replacement portion 36. In this case, as Co in the aforementioned expression 2, a corresponding region color (average color of the corresponding region) is used in place of color information of the object color. The color set update portion 10 is configured thus so that the source color in the color set can be updated automatically by use of the corresponding region color of the corresponding region.

As for the color correction device 1 configured as described above, the operation thereof will be described with reference to FIGS. 10 to 15.

First, the operation in the case where the color correction device 1 according to the embodiment of the invention performs color correction and source color updating by using an object color of a source object will be described with reference to FIGS. 10 to 12.

Figure 10:
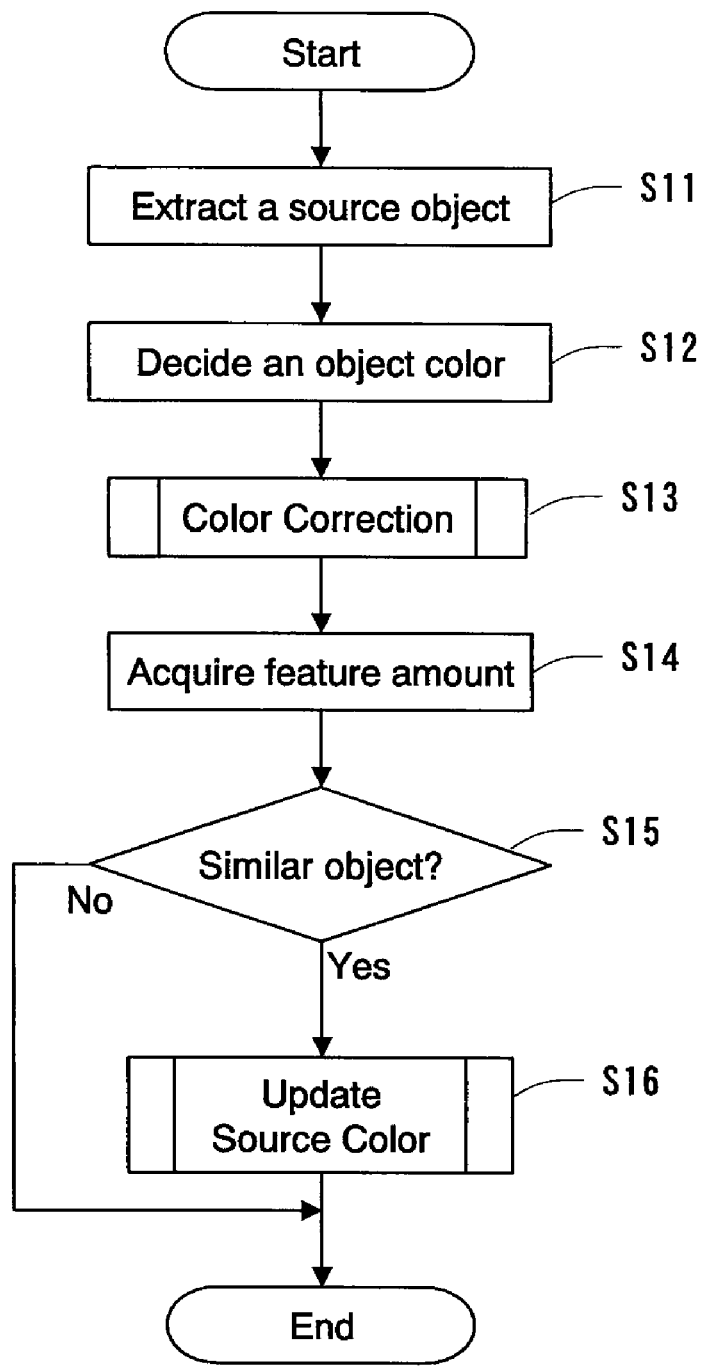
FIG. 10 is a flow chart showing an overall flow in the case where color correction and source color updating are performed by use of an object color of a source object in an embodiment of the invention.

FIG. 10 is a flow chart showing an overall flow in the case where the color correction device 1 according to the embodiment performs color correction and source color updating by using an object color of a source object. In this embodiment, the source image acquisition portion 5 of each client unit 3 always acquires a source image from the camera 2 at a predetermined frame rate.

As shown in FIG. 10, to perform color correction and source color updating by use of an object color of a source object, first, the source object extraction portion 14 of the region selection portion 6 extracts a source object from the source image (S11). Next, the object color decision portion 17 of the region color decision portion 7 decides a representative color of the source object (e.g. average color of the source object) as an object color (S12). Then, the color correction portion 8 performs color correction by using the object color of the source object (S13).

Figure 11:
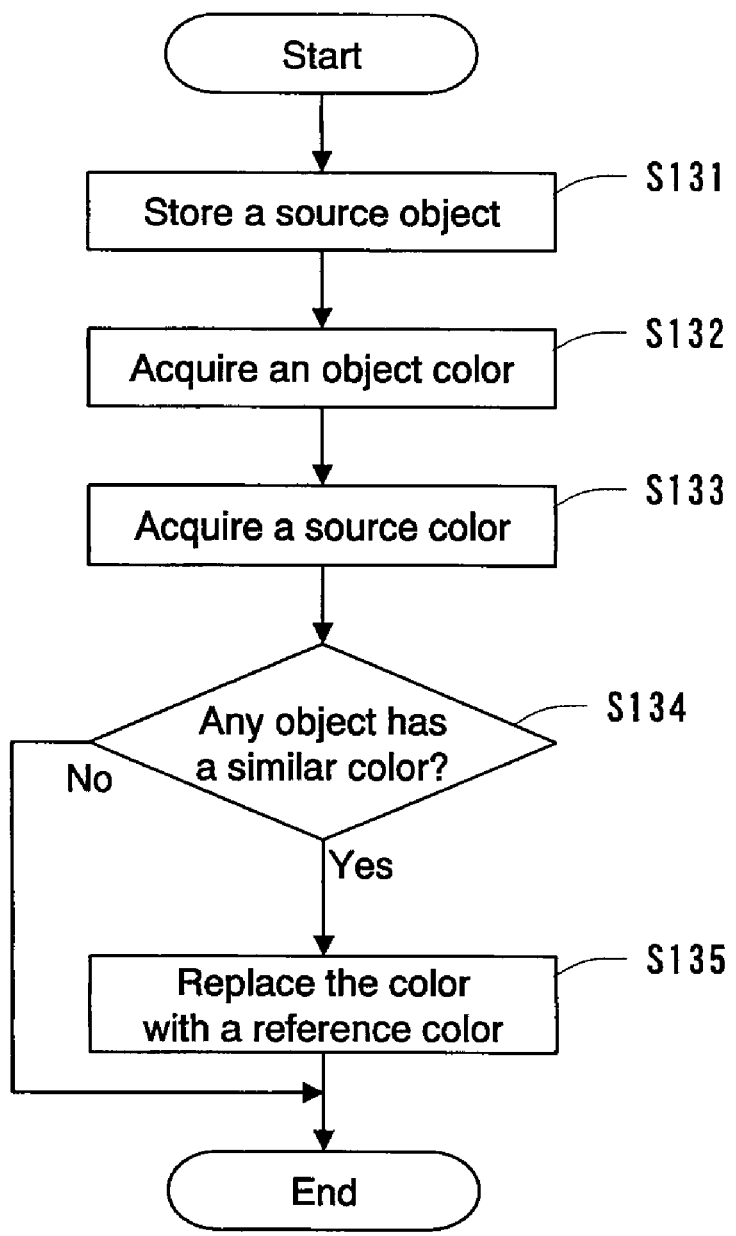
FIG. 11 is a flow chart showing a flow in the case where color correction is performed by use of an object color of a source object in an embodiment of the invention.

FIG. 11 is a flow chart showing a flow in the case where the color correction portion 8 performs color correction (S13) by using the object color of the source object. As shown in FIG. 11, to perform color correction by use of the object color, first, object information of the source object is stored in the source object storage portion 19 (S131). Then, the similar region search portion 22 acquires color information of the object color of the source object from the object information (S132) and acquires color information of the source color in the color set from the color set information storage portion 11 (S133).

Further, the similar region search portion 22 searches for a source object having a color in a range similar to the source color (S134). When some source object having a color in a range similar to the source color is found, the region color replacement portion 23 replaces the color of the source object with a reference color corresponding to the source color (S135) and color correction is terminated. On the other hand, when any source object having a color in a range similar to the source color is not found, processing is terminated without color replacement.

After color correction (S13) is performed as described above, the feature amount acquisition portion 24 of the object similarity judgment portion 12 of the server unit 4 acquires feature amount of the source object and the reference object (S14). The feature similarity judgment portion of the object similarity judgment portion 12 judges similarity between the source object and the reference object on the basis of the feature amount of the source object and the reference object (S15).

When a judgment is made that the source object is similar to the reference object, the color set update portion 10 of the client unit 3 updates the source color by using the object color of the source object (S16). On the other hand, when a judgment is made that the source object is not similar to the reference object, processing is terminated without updating the source color.

Figure 12:
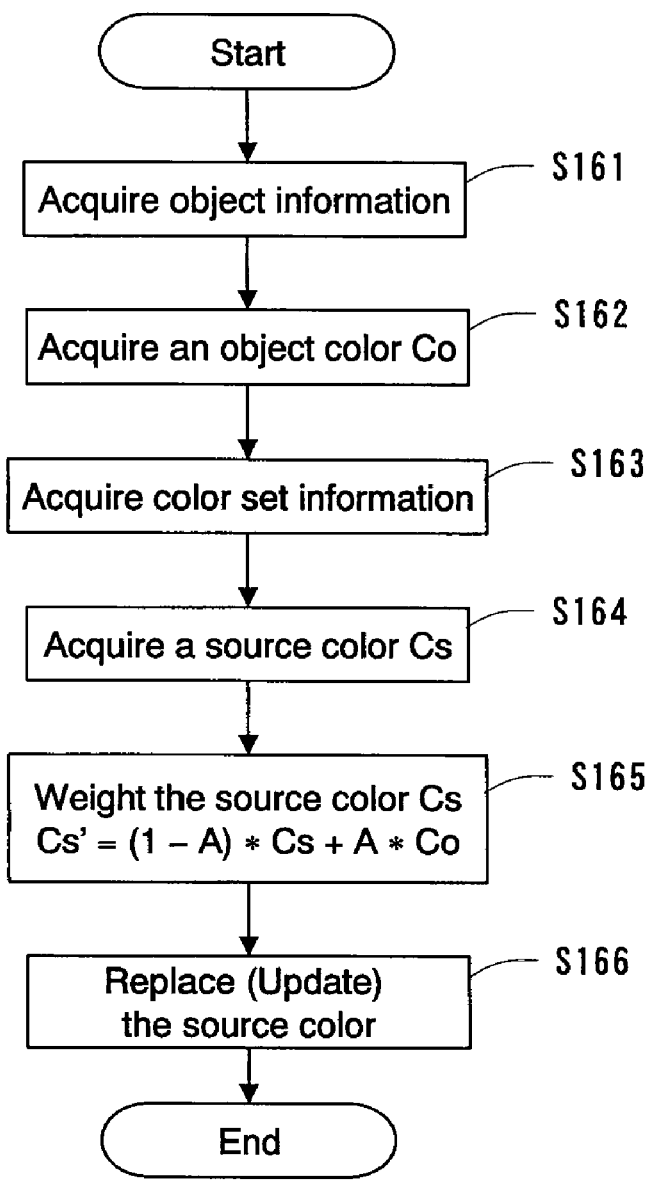
FIG. 12 is a flow chart showing a flow in the case where source color updating is performed by use of an object color of a source object in an embodiment of the invention.

FIG. 12 is a flow chart showing a flow in the case where the color set update portion 10 updates the source color (S16) by using the object color of the source object. As shown in FIG. 12, to update the source color by using the object color, object information of the source object is first acquired by the source region information acquisition portion 33 of the color set update portion 10 (S161). The object color is then acquired from the object information of the source object by the region color acquisition portion 34 (S162). The color set information acquisition portion 31 acquires color set information from the color set information storage portion 11 (S163). The source color acquisition portion 32 searches the color set information for a source color corresponding to the source object and acquires the source color (S164).

Then, the weighted calculation portion 35 of the color set update portion 10 calculates a weighted average of the object color and the source color (S165), so that a new source color is obtained from the object color and the source color. The source color replacement portion 36 replaces the old source color in the color set with the new source color (S166). In this manner, the source color in the color set is updated automatically.

Next, an operation in the color correction device 1 according to the embodiment of the invention when color correction and source color updating is performed by use of a corresponding region color of a corresponding region will be described with reference to FIGS. 13 to 15.

Figure 13:
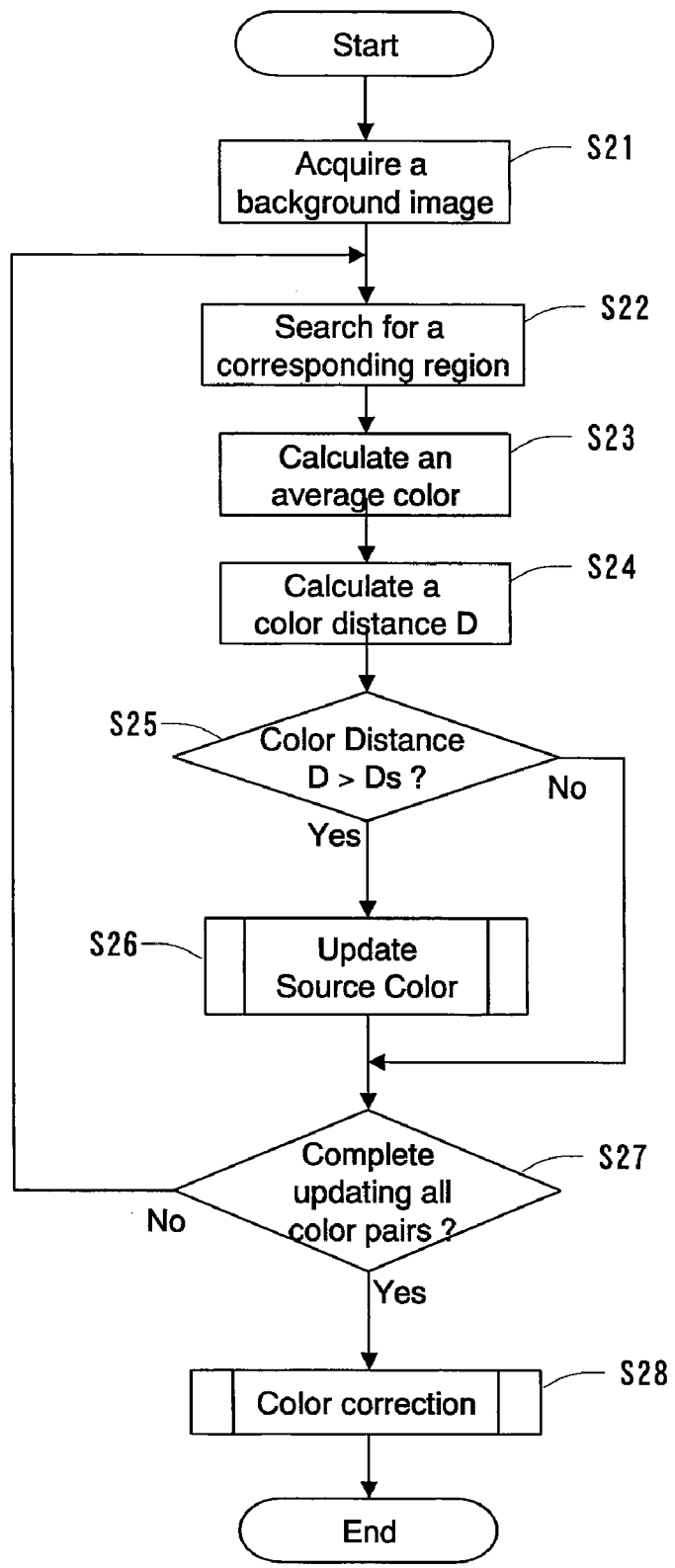
FIG. 13 is a flow chart showing an overall flow in the case where color correction and source color updating are performed by use of a corresponding region color of a corresponding region in an embodiment of the invention.

FIG. 13 is a flow chart showing an overall flow in the color correction device 1 according to the embodiment in the case where color correction and source color updating is performed by use of a corresponding region color of a corresponding region of a background image. Also in this embodiment, the source image acquisition portion 5 of each client unit 3 always acquires a source image from the camera 2 at a predetermined frame rate.

As shown in FIG. 13, when color correction and source color updating is to be performed by use of a corresponding region color of a corresponding region, the background image acquisition portion 15 of the region selection portion 6 first acquires a background image from a source image (S21). The acquisition of the background image is performed at regular time intervals (for example, at intervals of 1 minute or 5 minutes). Then, the corresponding region search portion 16 of the region selection portion 6 searches the background image for a corresponding region corresponding to region information of the source color in a color set (S22). Then, the corresponding region color decision portion 18 of the region color decision portion 7 calculates a representative color of the corresponding region (e.g. an average color of the corresponding region) and decides the representative color as a corresponding region color (S23).

Subsequently, the lighting change detection portion 9 acquires the source color in the color set and the corresponding region color, and the color distance calculation portion 29 calculates a color distance D between the source color in the color set and the corresponding region color (S24). Then, the lighting change judgment portion 30 judges whether or not the color distance D is larger than a threshold color distance Ds (S25). When a result of the judgment shows that the color distance D is larger than the threshold color distance Ds, a judgment is made that there is a change of lighting environment and source color updating (S26) is performed. On the other hand, when the color distance D is not larger than the threshold color distance Ds, a judgment is made that there is no change of lighting environment and source color updating is not performed.

Figure 14:
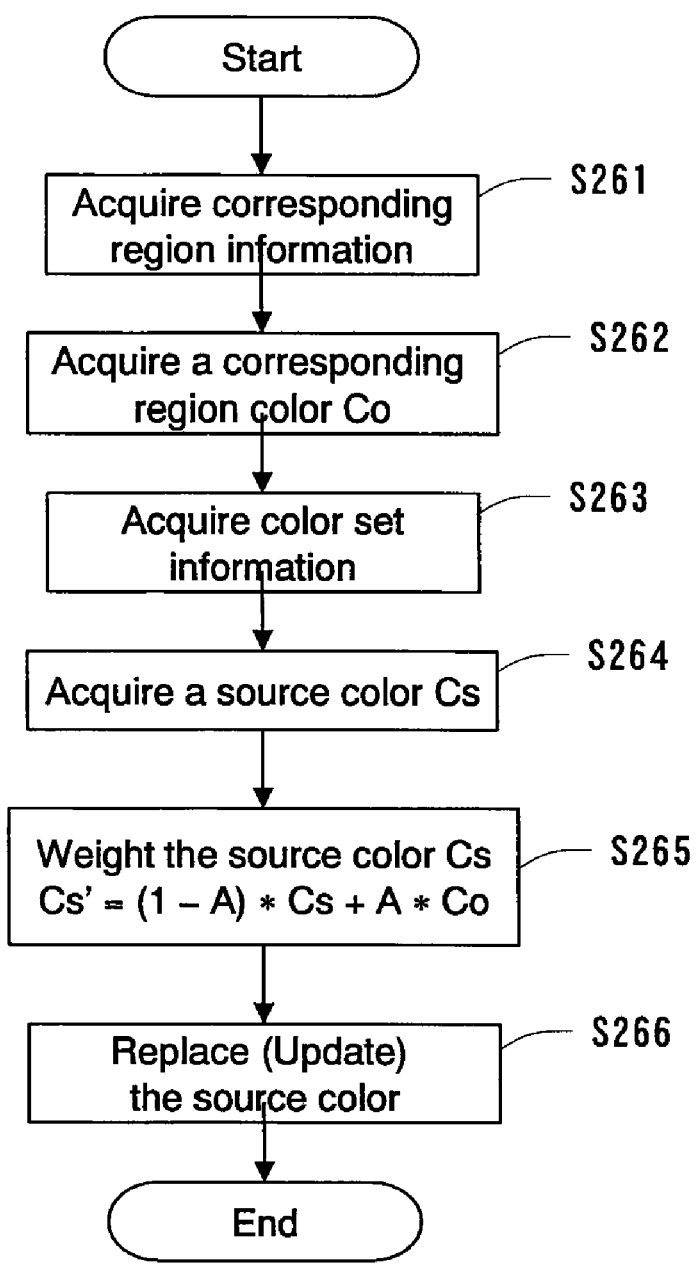
FIG. 14 is a flow chart showing a flow in the case where source color updating is performed by use of a corresponding region color of a corresponding region in an embodiment of the invention.

FIG. 14 is a flow chart showing a flow in the case where the color set update portion 10 performs source color updating (S26) by using a corresponding region color of a corresponding region. As shown in FIG. 14, when source color updating is to be performed by use of a corresponding region color, the source region information acquisition portion 33 of the color set update portion 10 first acquires corresponding region information of a corresponding region (S261). Further, the region color acquisition portion 34 acquires a corresponding region color from the corresponding region information of the corresponding region (S262). Further, the color set information acquisition portion 31 acquires color set information from the color set information storage portion 11 (S263). Further, the source color acquisition portion 32 acquires a source color by searching the color set information for a source color corresponding to the corresponding region (S264).

Then, the weighted calculation portion 35 of the color set update portion 10 calculates a weighted average of the corresponding region color and the source color so as to obtain a new source color from the corresponding region color and the source color (S265). Further, the source color replacement portion 36 replaces the old source color in the color set with the new source color (S266). In this manner, the source color in the color set is updated automatically.

After source color updating (S26) as described above is completed for one color set, a judgment is made as to whether or not source color updating is completed for all color sets (S27). When a result of the judgment shows that source color updating is not completed for all color sets, a background image is searched for a corresponding region corresponding to region information of a source color in a color set again (S22) and an average color is calculated (S23). Further, a judgment is made as to whether or not there is a change of lighting environment (S24 and S25). In this manner, source color updating (S26) is performed repeatedly for the remaining color sets.

Then, the color correction portion 8 performs color correction by using the color set updated as described above (S28).

Figure 15:
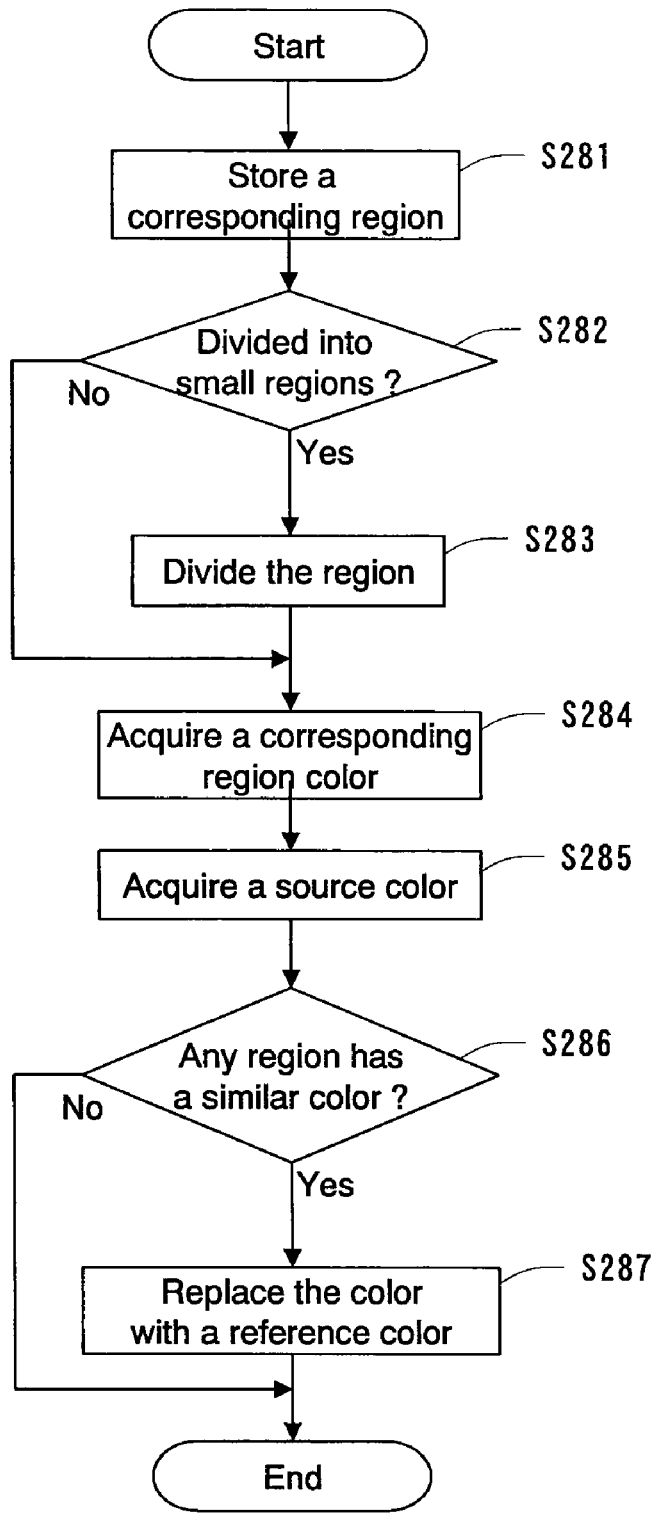
FIG. 15 is a flow chart showing a flow in the case where color correction is performed by use of a corresponding region color of a corresponding region in an embodiment of the invention.

FIG. 15 is a flow chart showing a flow in the case where the color correction portion 8 performs color correction (S28) by using a corresponding region color of a corresponding region. As shown in FIG. 15, when color correction is to be performed by use of a corresponding region color, corresponding region information of a corresponding region is first stored in the corresponding region storage portion 20 (S281).

Then, the region division portion 21 of the color correction portion 8 judges whether or not the corresponding region need be divided into small regions (S282). In this embodiment, when, for example, the corresponding region is a region such as a street tree composed of a plurality of color regions (e.g. two regions having a green region of a leaf and a brown region of a trunk), a judgment is made that the corresponding region need be divided into small regions, and region division is performed (S283). On the other hand, when the corresponding region is a region such as a road composed of a single color region (e.g. a gray region of a paved surface), a judgment is made that the corresponding region need not be divided into small regions.

Then, the region search portion of the color correction portion 8 acquires color information of a corresponding region color of a corresponding region (or a small region) from the stored corresponding region information (S284) and acquires color information of a source color in a color set from the color set information storage portion 11 (S285). Further, the similar region search portion 22 searches for a corresponding region (or a small region) having a color in a range similar to the source color (S286).

When a corresponding region (or a small region) having a color in a range similar to the source color is found as a result of the search, the region color replacement portion 23 replaces the color of the corresponding region (or the small region) with a reference color corresponding to the source color (S287) and color correction is terminated. On the other hand, when a corresponding region (or a small region) having a color in a range similar to the source color is not found, processing is terminated without color replacement.

According to the color correction device 1 according to the embodiment of the invention, since the provision of the color set update portion 10 for updating a source color in a color set by using a source region color (object color, corresponding region color) can eliminate the necessity of holding color set information unnecessary for color correction, the load on calculation can be reduced so that the color correction device 1 can operate in accordance with a change of lighting environment in real time.

That is, in this embodiment, the color set update portion 10 updates a source color in a color set by replacement using source region colors (an object color and a corresponding region color) of source regions (a source object and a corresponding region). Accordingly, even when an object to be traced is added or when there is a change of lighting environment, color set information unnecessary for color correction need not be held. Hence, the quantity of information held for color correction can be reduced, so that the load on calculation can be reduced. Accordingly, the time required for color correction can be shortened, so that the operation of color correction becomes stable. Moreover, since the load on calculation is small, it is possible to perform an operation in accordance with a change of lighting environment in real time.

Further, in this embodiment, even when an object to be traced is added, the object similarity judgment portion 12 judges whether or not the source object is similar to a reference object. When a judgment is made that the source object is similar to the reference object, the color set update portion 10 updates a source color in a color set by using an object color of the source object (an average color of the source object). Hence, color set information unnecessary for color correction need not be held. Accordingly, the quantity of information held for color correction can be reduced, so that the load on calculation can be reduced.

Further, in this embodiment, the object similarity judgment portion 12 can judge the similarity of objects by using feature amounts (e.g. moving velocity, size, aspect ratio, etc.) of the source object and the reference object. Hence, accuracy in correspondence between the source object and the reference object is improved, so that accuracy in tracing the source object is improved.

Further, in this embodiment, the color set update portion 10 uses a weighted average color obtained by calculating a weighted average of the object color and the source color as a source color for updating. Hence, even when the color difference between the object color of the source object and the source color of the color set is large, the degree of weighting can be adjusted so that the source color for updating can be adjusted.

Further, in this embodiment, when there is a change of lighting environment, the lighting change detection portion 9 judges that there is a change of lighting environment. When a judgment is made that there is a change of lighting environment, the color set update portion 10 updates the source color of the color set by using a corresponding region color. Hence, color set information unnecessary for color correction need not be held. Accordingly, the quantity of information held for color correction can be reduced, so that the load on calculation can be reduced.

Further, in this embodiment, the lighting change detection portion 9 judges whether or not there is a change of lighting environment, by using the color distance between the corresponding region color and the source color (distance between two color coordinates in a color space). Hence, the load on calculation is reduced and adaptability to a change of lighting environment or the like is improved, compared with the conventional method of detecting a change of lighting environment.

Further, in this embodiment, the background image acquisition portion 15 of the region selection portion 6 acquires a background image from a source image at intervals of a predetermined time (e.g. at intervals of 1 minute or 5 minutes). Then, in lighting change detection, a change of lighting environment is detected from the background image. Accordingly, by adjusting the predetermined time interval in accordance with the frequency in change of lighting environment, the frequency in calculation for detecting a change of lighting environment can be adjusted so that the load on calculation can be reduced compared with the case where a change of lighting environment is always detected.

Further, in this embodiment, when the corresponding region (e.g. a street tree) is composed of a plurality of small regions (e.g. a leaf portion and a trunk portion) having different colors, the color correction portion 8 updates the source color by using corresponding region colors corresponding to the small regions. Hence, accuracy in correspondence of the corresponding region is improved.

Although the embodiment of the invention has been described by way of example, the scope of the invention is not limited thereto and the invention may be changed and modified in accordance with purposes within the scope described in Claims.

For example, although the above description shows the case where a camera 2 for picking up a still image at a predetermined frame rate is used as each image pickup device, the scope of the invention is not limited thereto and a camera (video camera) for always picking up motion images may be used instead.

Further, although the above description shows the case where the color correction device 1 has two client units 3 and one server unit 4, the scope of the invention is not limited thereto. For example, each client unit 3 may have functions (an object similarity judgment unit and a reference object storage unit) of the server unit 4.

Further, although the above description shows the case where two cameras 2 are used as image pickup devices, the scope of the invention is not limited thereto and the invention can be applied also to the case where the number of image pickup devices is three or more.

Further, although the above description shows the case where regions photographed by the cameras A and B overlap each other partially (see FIG. 2), the scope of the invention is not limited thereto and the invention can be applied also to the case where regions photographed by the cameras A and B do not overlap each other.

Further, although the above description shows the case where selection and updating of a color set is performed automatically by the color correction device 1, the scope of the invention is not limited thereto and the invention can be applied also to the case where a user selects a color set manually and region information of the color set is used for updating the color set.

EMBODIMENTS OF SECOND INVENTION

Embodiments of the invention (second invention) as to a dynamic camera color correction device will be described below with reference to the drawings.

First Embodiment

Figure 16:
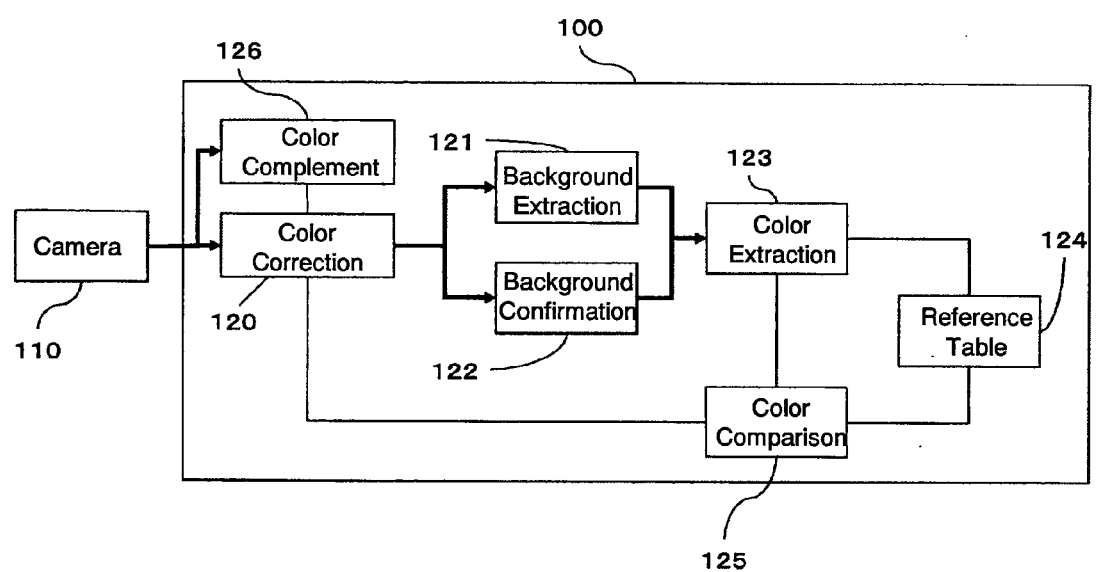
FIG. 16 is a block diagram of a dynamic camera color correction device according to a first embodiment of the invention (second invention).

FIG. 16 shows the configuration of a dynamic camera color correction device according to a first embodiment of the invention. A dynamic camera color correction device 100 is connected to a camera 110 which outputs a color image. The dynamic camera color correction device 100 includes: a color complement portion 126 which decides a color correction parameter from a specific color chart; a color correction portion 120 which performs color correction of an image picked up by the camera 110 on the basis of the color correction parameter; a background extraction portion 121 which extracts background information from a video (color-corrected image) inputted via the color correction portion 120; a background confirmation portion 122 which confirms whether or not a pixel of the video inputted via the color correction portion 120 is a background pixel; a color extraction portion 123 which calculates position information and color information of the pixel from a video outputted from the background extraction portion 121 and the background confirmation portion 122; a reference table 124 which has position information and color information of the background pixel as a table; and a color comparison portion 125 which compares the position information and color information extracted via the background confirmation portion 122 and the color extraction portion 123 with the position information and color information stored in the reference table 124 and issues a color correction value change instruction to the color correction portion 120 when the two are different from each other. Incidentally, the color correction parameter is included in the color correction portion.

Incidentally, in FIG. 16, the camera 110 connected to the dynamic camera color correction device 100 is shown as an example and the number of cameras 110 is not limited. Further, the thick solid arrow in FIG. 16 represents a video signal. For example, when the camera 110 outputs a signal compliant with NTSC, the thick solid arrow represents a signal compliant with NTSC.

An initial working operation and an ordinary working operation in the dynamic camera color correction device 100 configured as described above will be described as two kinds of working operations. The initial working operation is an operation which is performed only once at the time of installation of the camera for dynamic color correction. The ordinary working operation is an operation by which dynamic color correction is performed by use of initial values set by the initial working operation and which is a chief part of the invention.

First, the initial working operation will be described with reference to FIGS. 17, 18 and 19. Assume that one object is photographed by the camera. When the object is photographed in the morning, the image of the object is dark because the light intensity of the sun is weak. When the object is photographed in the daytime, the image of the object is bright because the light intensity of the sun is strong. When the object is photographed in the evening, the image of the object is reddish. For this reason, it is necessary to perform color correction to equalize a color space photographed in the morning or a color space photographed in the evening to a color space photographed in the daytime.

Figure 17A:
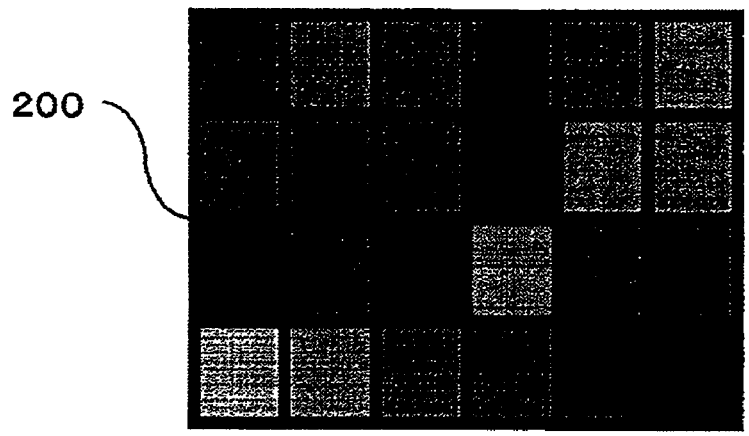
FIG. 17A is a schematic view of a color chart in the first embodiment of the invention.
Figure 17B:
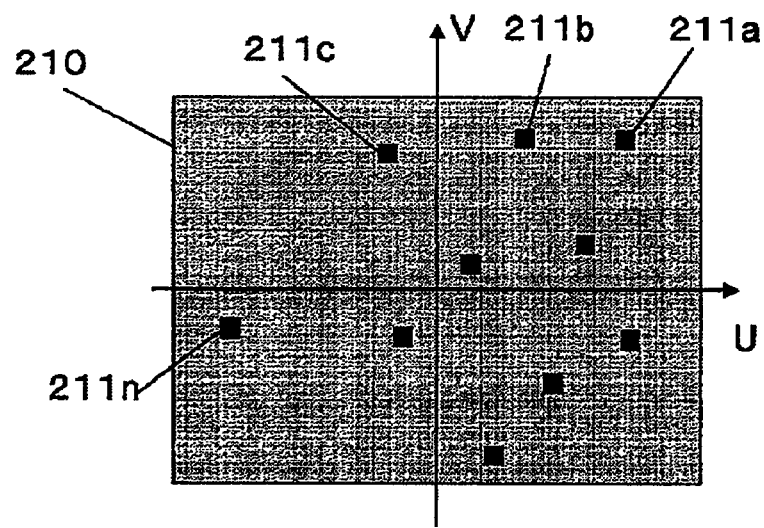
FIG. 17B is an example of a theoretical UV color space and theoretical UV values in a color chart.
Figure 17C:
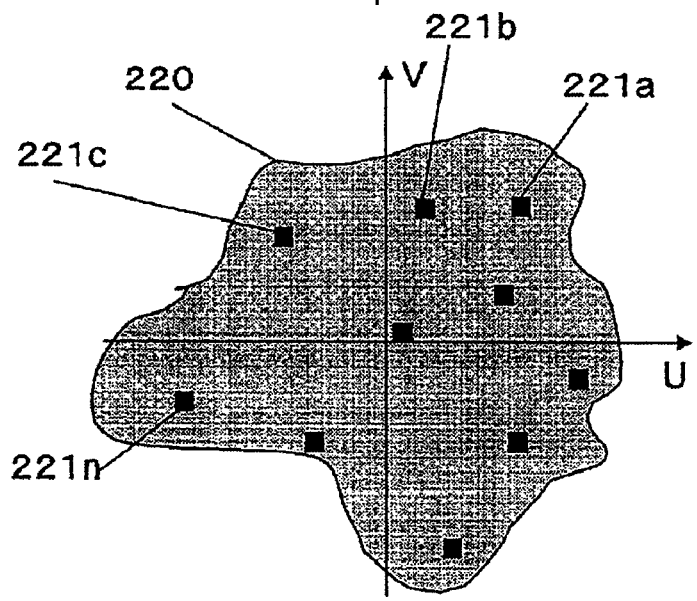
FIG. 17C is an example of a UV color space and UV values in the case where a color chart is photographed by a camera.

FIG. 17A is a schematic view of a color chart. FIG. 17B is an example of a theoretical UV color space and theoretical UV values of the color chart. FIG. 17C is an example of a UV color space and UV values in the case where the color chart is photographed by the camera.

For example, an RGB color space has 255×255×255=16770000 colors since R (red) takes a value of 0 to 255, G (green) takes a value of 0 to 255 and B takes a value of 0 to 255. Although the color space can be equalized when 16770000 colors are photographed by a camera and subjected to color correction, it is unrealistic that 16770000 colors are prepared and photographed by a camera since the number of man-hour becomes enormous. It is therefore general to use a method in which: a three-dimensional RGB color space is converted into a two-dimensional UV space by removal of luminance information from the three-dimensional RGB color space; a color chart 200 (FIG. 17A) having several kinds of representative colors in the UV space is photographed by a camera; and other colors than the representative colors are complemented.

FIG. 17B shows a range 210 in which a UV color space can be expressed theoretically in a UV color space. FIG. 17B also shows theoretical values 211*a*, 211*b*, 211*c*, . . . , 211*n* of representative colors in the color chart 200. When an image (composed of the three colors of RGB) obtained by photographing the representative colors of the color chart 200 with the camera 110 is converted into a UV space again, UV values 221*a*, 221*b*, 221*c*, . . . , 221*n* shown in FIG. 17C are taken.

Since it is already known that the theoretical value 211*a* and the UV value 221*a* correspond to each other, the theoretical value 211*b* and the UV value 221*b* correspond to each other, . . . , the theoretical value 211*n* and the UV value 221*n* correspond to each other, the color space 220 (FIG. 17C) other than the representative colors can be complemented. Incidentally, the number of representative colors in FIG. 17 is shown only as an example and not for limitation of the number of representatives. Further, the color space is not limited to a UV color space.

Figure 18:
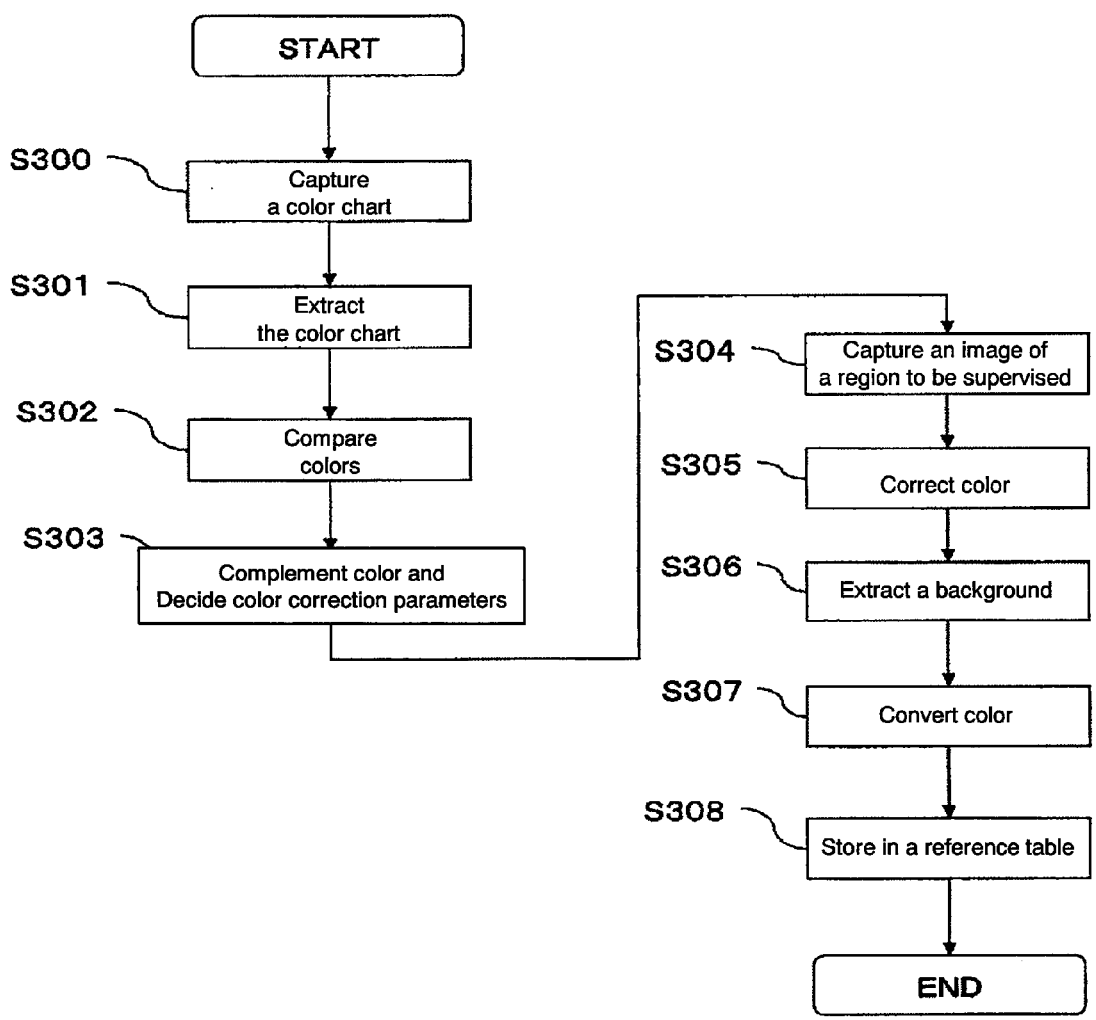
FIG. 18 is a flow chart for explaining the operation of the dynamic camera color correction device according to the first embodiment of the invention.

FIG. 18 shows a flow chart for explaining the initial working operation of the dynamic camera color correction device according to the first embodiment of the invention. First, the camera 110 photographs the color chart 200 (S300). The color complement portion 126 extracts the color chart 200 from an image picked up by the camera 110 (S301) and compares the colors of the color chart 200 photographed by the camera 110 with colors proper to the color chart 200 (S302). The color complement portion 126 performs color complement of other colors than the color chart 200 on the basis of a result of the comparison and sends color correction parameters to the color correction portion 120 (S303).

Figure 19:
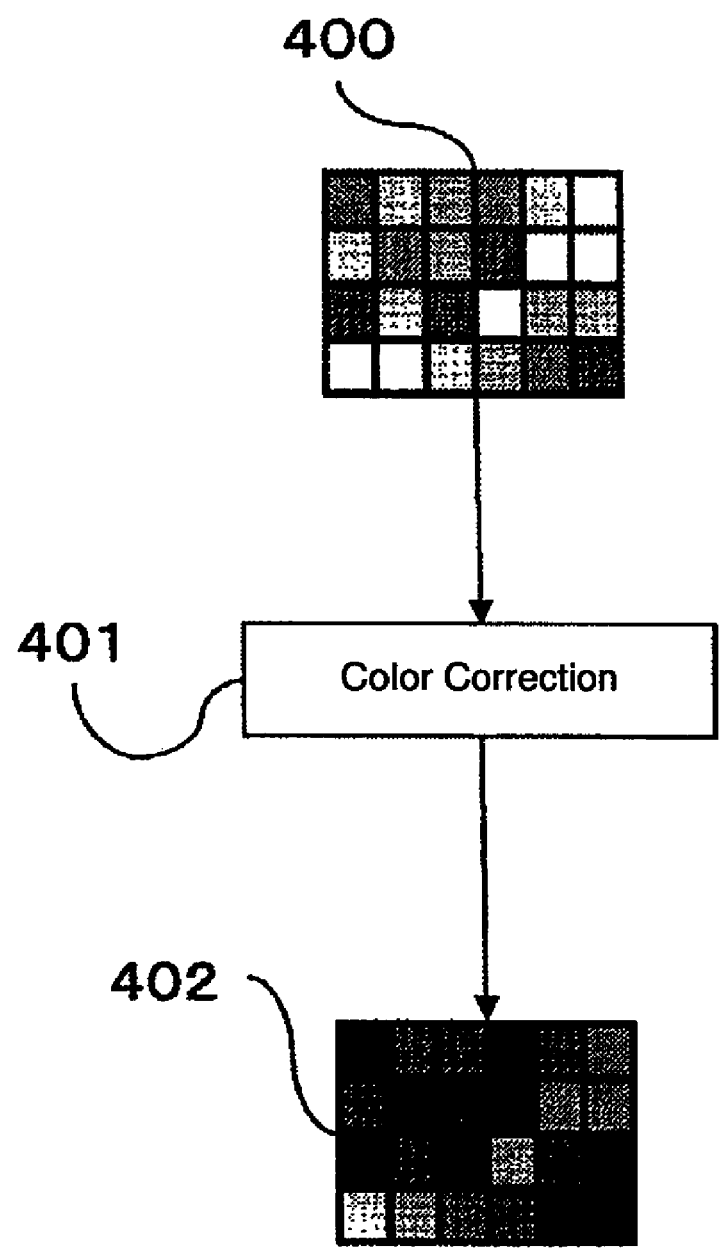
FIG. 19 is a schematic view for explaining the color correction operation of the dynamic camera color correction device according to the first embodiment of the invention.

FIG. 19 is a schematic view for explaining the color correction operation of the dynamic camera color correction device. For example, when the color chart 200 is photographed in the daytime where the light intensity of the sun is large, a color chart 400 photographed by the camera 110 is photographed while skipped. However, the color correction portion 120 performs color correction 401 based on the color correction parameters to thereby output a color chart 402 of a color space proper to the color chart 200.

Referring back to FIG. 18, the camera 110 photographs a region to be supervised (S304). The color correction portion 120 performs color correction of a photographed image based on the color correction parameters (S305) and inputs a result of the color correction to the background extraction portion 121. The image photographed by the camera 110 has a foreground and a background. The foreground is an always movable object such as a man or a car whereas the background is an immovable object such as a wall or a ground. The background extraction portion 121 generates a background image by extracting only background information except foreground information (S306).

Here is shown an example of algorithm for performing background extraction (generation of a background image). With respect to a camera photograph image group as several frames of camera photograph images, it can be assumed that the quantity of information contained in the background is much larger than the quantity of information contained in the foreground. A background image is generated in such a manner that a modal value per pixel in a frame is regarded as a background pixel by use of a least squares median method in which a modal value is taken from a population having any number of pieces.

The color extraction portion 123 acquires color information by removing a luminance signal such as Y (luminance) U or V (color) from the background image extracted by the background extraction portion 121 (S307). The converted color information is stored in the reference table 124 while associated with position information of background pixels (S308).

FIG. 20 shows an example of the reference table. The reference table is in an example of the case where the camera 110 is compliant with NTSC and color information is compliant with the YUV standard. In each of 720×480 positions in the reference table, U in a range of 16 to 240 and V in a range of 16 to 240 are stored.

Figure 21:
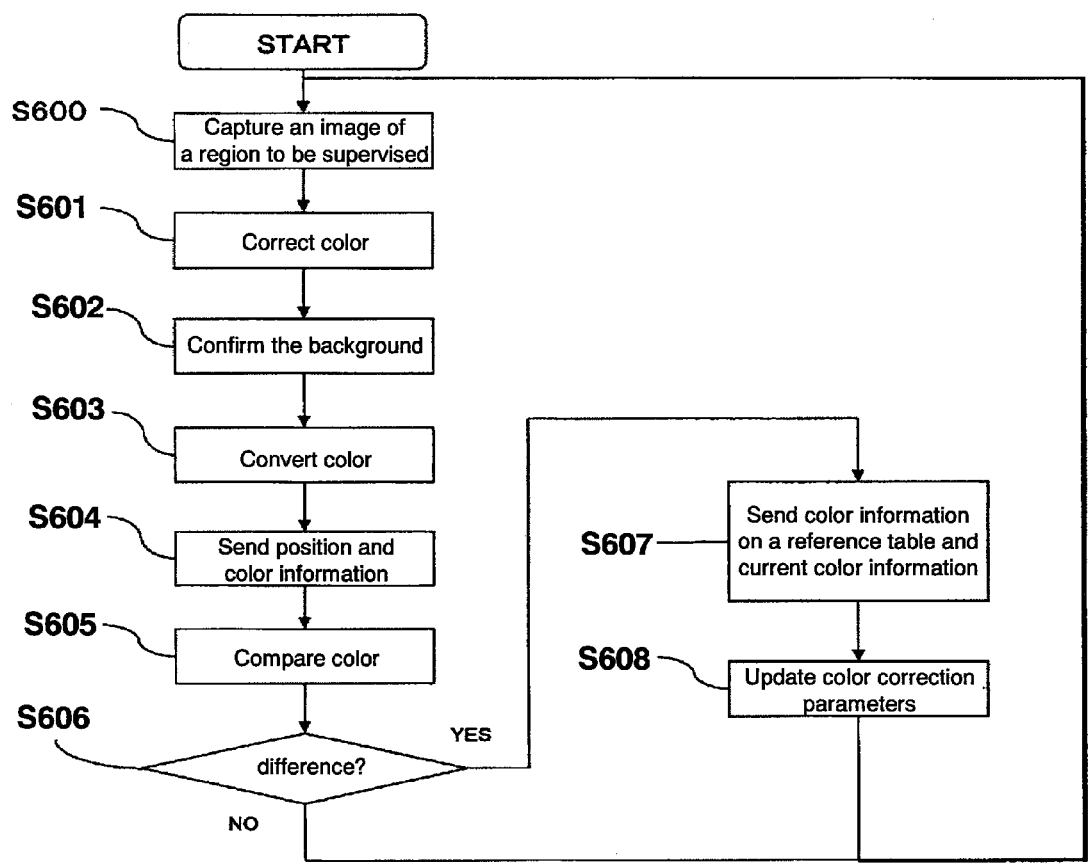
FIG. 21 is a flow chart for explaining the operation of the dynamic camera color correction device according to the first embodiment of the invention.

FIG. 21 shows a flow chart for explaining the ordinary working operation of the dynamic camera color correction device according to the first embodiment of the invention. The ordinary working operation will be described with reference to FIG. 21. The camera 110 photographs a region to be supervised (S600). The color correction portion 120 performs color correction of the photograph image (S601) and inputs a result of the color correction to the background confirmation portion 122.

The background confirmation portion 122 confirms whether each pixel is a background pixel or a foreground pixel, on the basis of the input photograph image by using a difference method or a motion vector method (S602). For example, in the case of use of a difference method, a difference between a photograph image in a current frame and a photograph image in a frame just previous to the current frame is calculated so that a motion region is extracted and a region other than the motion region is regarded as a background.

The color extraction portion 123 acquires color information except a luminance signal with respect to pixels confirmed as the background by the background confirmation portion 122 (S603). The algorithm of acquiring color information is the same as in the step S307. The extracted color information and position information of the pixels are sent to the color comparison portion 125 (S604).

The color comparison portion 125 compares the color information sent in S604 with the color information stored in the reference table 124 on the basis of the position information (S605). When values of the color information are different from each other (S606), a judgment is made that the color space set by the initializing operation has changed because of a change of sunshine or the like. The color comparison portion 125 sends a color correction value change instruction, the color information of the reference table 124 and the color information via the background confirmation portion 122 to the color correction portion 122 (S606).

The color correction portion 120 updates (changes) the color correction parameters on the basis of the color information of the reference table 124 and the color information via the background confirmation portion 122 so that the background color at the current time is outputted as a background color at the initializing operation (S607). When values of the color information are not different from each other (S606), the situation of the processing goes back to the step S600.

According to such a dynamic camera color correction device according to the first embodiment of the invention, color correction of the photograph image can be performed automatically regardless of a change of installation environment of the camera 110 and a change of photograph environment such as a change of sunshine, by a method in which: position and color information of a background photographed by the camera 110 at the time of initialization is held in the reference table 124 by the background extraction portion 121 and the color extraction portion 123; the background of the working camera 110 is extracted by the background confirmation portion 122 and the color extraction portion 123; comparison is made by the color comparison portion 125 as to whether the color space has changed in accordance with a change of sunshine; and color correction parameters are updated by the color correction portion 122.

Second Embodiment

Figure 22:
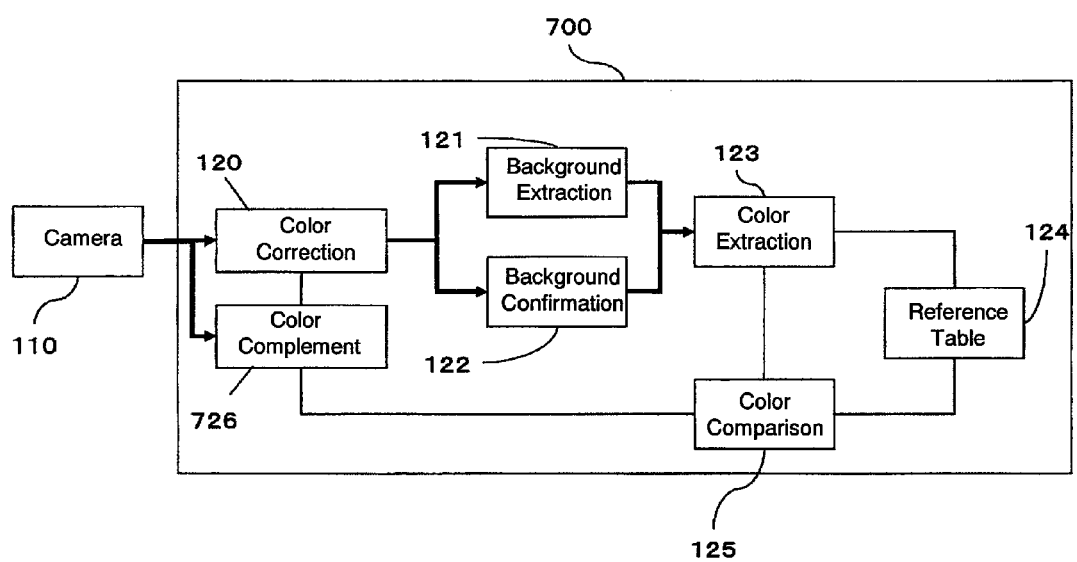
FIG. 22 is a block diagram of a dynamic camera color correction device according to a second embodiment of the invention.

A dynamic camera color correction device according to a second embodiment of the invention will be described below. FIG. 22 shows the configuration of the dynamic camera color correction device according to the second embodiment of the invention. Incidentally, in FIG. 22, parts common with FIG. 16 are referred to by the same numerals and description thereof will be omitted.

In FIG. 22, the dynamic camera color correction device 700 according to this embodiment includes a color complement portion 726 in addition to the color correction portion 120, the background extraction portion 121, the background confirmation portion 122, the color extraction portion 123, the reference table 124 and the color comparison portion 125 described in the embodiment 1.

An initial working operation and an ordinary working operation in the dynamic camera color correction device 700 configured as described above will be described as two kinds of working operations. The initial working operation is the same as the aforementioned steps S300 to S308 in FIG. 18 and description thereof will be omitted.

Figure 23A:
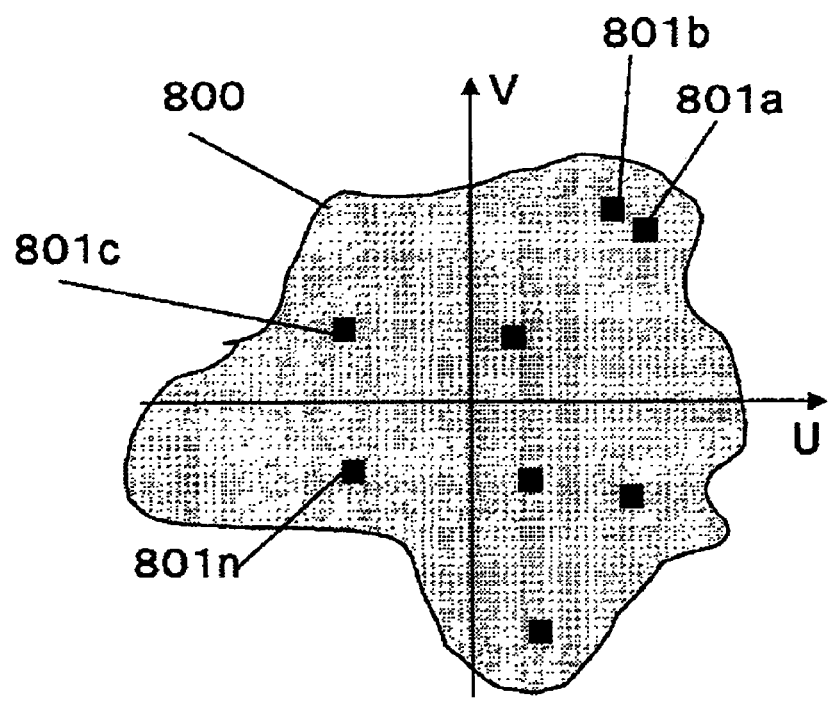
FIG. 23A is an example of a UV color space and UV values in the case where a background color is photographed by a camera in the second embodiment of the invention.
Figure 23B:
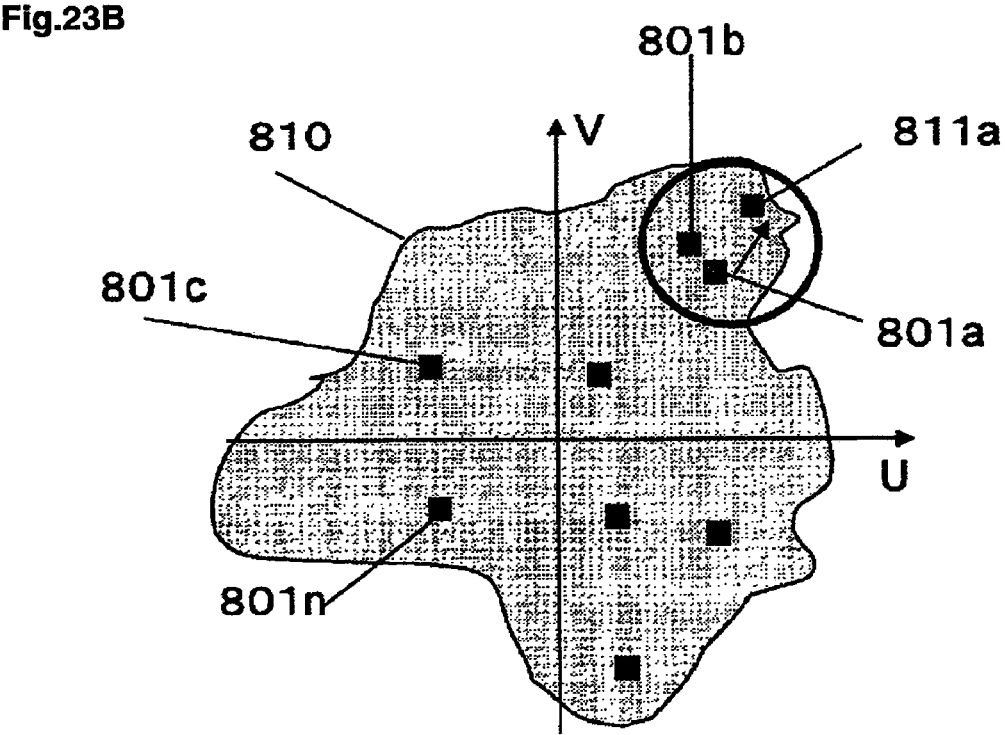
FIG. 23B is another example of a UV color space and UV values in the case where a background color is photographed by a camera.
Figure 24:
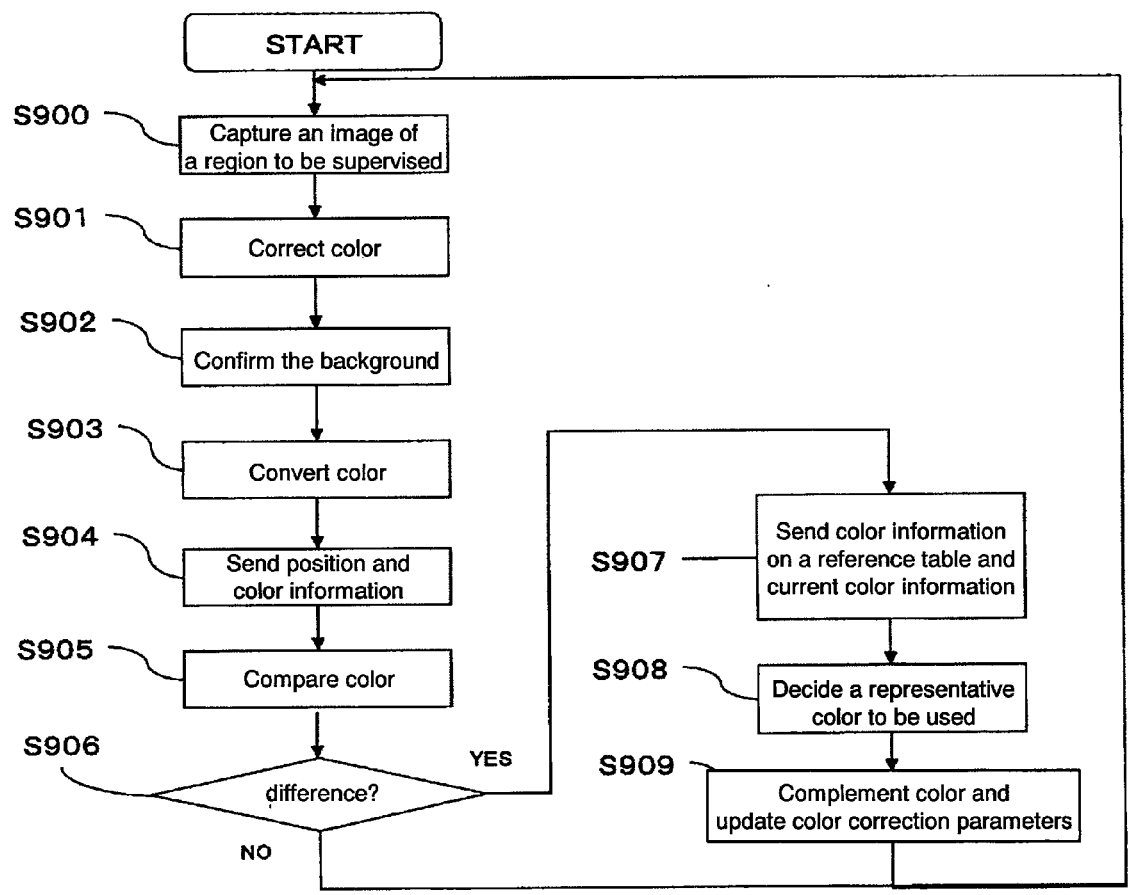
FIG. 24 is a flow chart for explaining the operation of the dynamic camera color correction device according to the second embodiment of the invention.

The ordinary working operation will be described with reference to FIGS. 23 and 24. FIG. 23 is an example of a UV color space and UV values in the case where a background color is photographed by a camera. FIG. 24 is a flow chart for explaining the operation of the dynamic camera color correction device according to the second embodiment of the invention. Steps S900 to S907 in FIG. 24 are the same as the aforementioned steps S600 to S607 in FIG. 21 and description thereof will be omitted.

For example, the UV color space photographed by the camera 110 is a UV color space 220 shown in FIG. 17B. Assume that U and V values of background pixels stored in the reference table 124 are 801$a$, 801$b$, ..., 801$n$. Assume that the color 801$a$ of a background pixel changes to 811$a$ in accordance with a change of sunshine or the like.

The color complement portion 726 searches the colors 801$a$, 801$b$, ..., 801$n$ of background pixels for a color close to the colors 801$a$ and 811$a$ of the background pixel (S908). When 801$b$ is close as shown in FIG. 23, the color complement portion 726 performs color complement by using 811$a$, 801$c$, ..., 801$n$ except the colors 801$a$ and 801$b$ and updates color correction parameters (S909)

According to the dynamic camera color correction device according to the second embodiment of the invention as described above, color correction can be made with higher accuracy because the color complement portion 726 performs color complement by using the color of the changed background pixel and updates the color correction parameters entirely.

Third Embodiment

Figure 25:
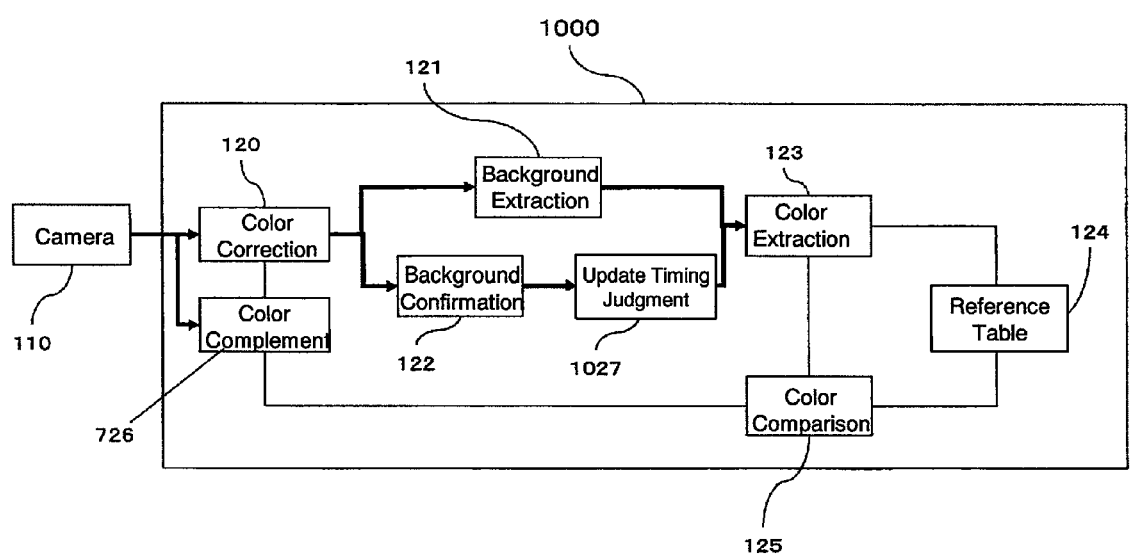
FIG. 25 is a block diagram of a dynamic camera color correction device according to a third embodiment of the invention.

A dynamic camera color correction device according to a third embodiment of the invention will be described below. FIG. 25 shows the configuration of the dynamic camera color correction device according to the third embodiment of the invention. Incidentally, in FIG. 25, parts common with FIGS. 16 and 22 are referred to by the same numerals and description thereof will be omitted.

In FIG. 25, the dynamic camera color correction device 1000 according to this embodiment includes an update timing judgment portion 1027 in addition to the color correction portion 120, the background extraction portion 121, the background confirmation portion 122, the color extraction portion 123, the reference table 124 and the color comparison portion 125 described in the embodiment 1 and the color complement portion 726 described in the embodiment 2.

An initial working operation and an ordinary working operation in the dynamic camera color correction device 1000 configured as described above will be described as two kinds of working operations. The initial working operation is the same as the aforementioned steps S300 to S308 in FIG. 18 and description thereof will be omitted.

Figure 26:
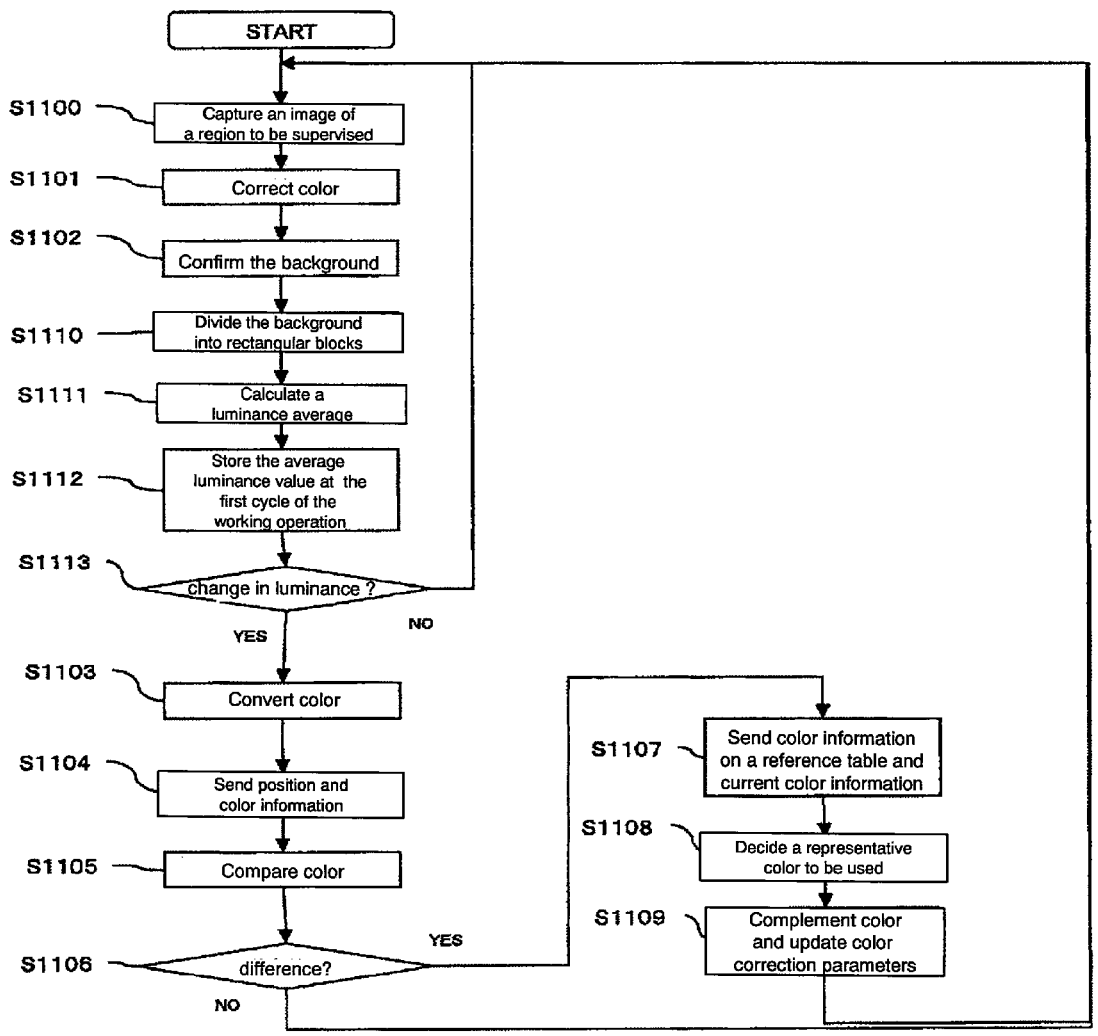
FIG. 26 is a flow chart for explaining the operation of the dynamic camera color correction device according to the third embodiment of the invention.
Figure 27:
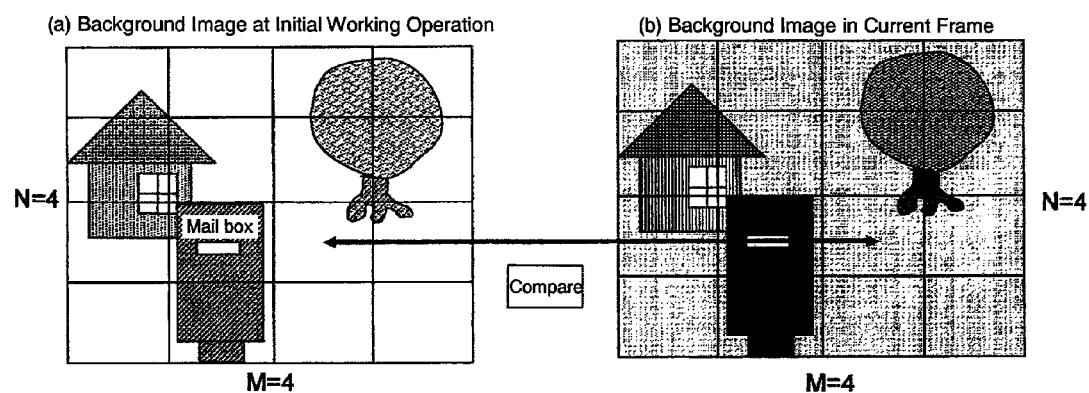
FIG. 27 is an example of a background image divided into blocks in the third embodiment of the invention.

The ordinary working operation will be described with reference to FIGS. 26 and 27. FIG. 26 is a flow chart for explaining the operation of the dynamic camera color correction device according to the third embodiment of the invention. Steps S1100 to S1109 in FIG. 26 are the same as the aforementioned steps S900 to S909 in FIG. 24 and description thereof will be omitted. FIG. 27 shows an example of a background image divided into blocks.

The update timing judgment portion 1027 divides a background image inputted from the background confirmation portion 122 into N×M rectangular parts as shown in FIG. 27 (S1110). Incidentally, the case of N=4 and M=4 in which the background image is divided into 16 parts as shown in FIG. 27 is shown as an example and not for limitation of the divisors N and M. The update timing judgment portion 1027 calculates an average of luminance values in each divided region (S1111).

In the case of the first cycle of the ordinary working operation, an average of luminance values in each region at the first cycle is stored as an average of luminance values at the initial working operation (S1112). The update timing judgment portion 1027 compares the average of luminance values in the current frame and the average of luminance values at the initial working operation with each other in each divided region (S1113).

When there is a large change in luminance value (S1113: YES), a judgment is made that a change of sunshine has occurred and the situation of the processing goes to the process of steps S1103 to S1109. When there is no large change in luminance value (S1113: NO), a judgment is made that a change of sunshine has not occurred and the situation of the processing goes back to the step S1100.

According to such a dynamic camera color correction device according to the third embodiment of the invention, the processing load on a CPU or DSP for performing color correction can be reduced because the update timing judgment portion 1027 detects a luminance value of a background image and judges whether or not the color comparison portion 125 need be worked, in accordance with a difference between the luminance value of the background image and a luminance value (reference luminance value) at the initial working operation so that color correction parameters are updated only when a change of sunshine occurs more largely than that at the initial working operation. Incidentally, the update timing judgment portion may judge whether or not the color comparison portion 125 need be worked, on the basis of color information.

Fourth Embodiment

Figure 28:
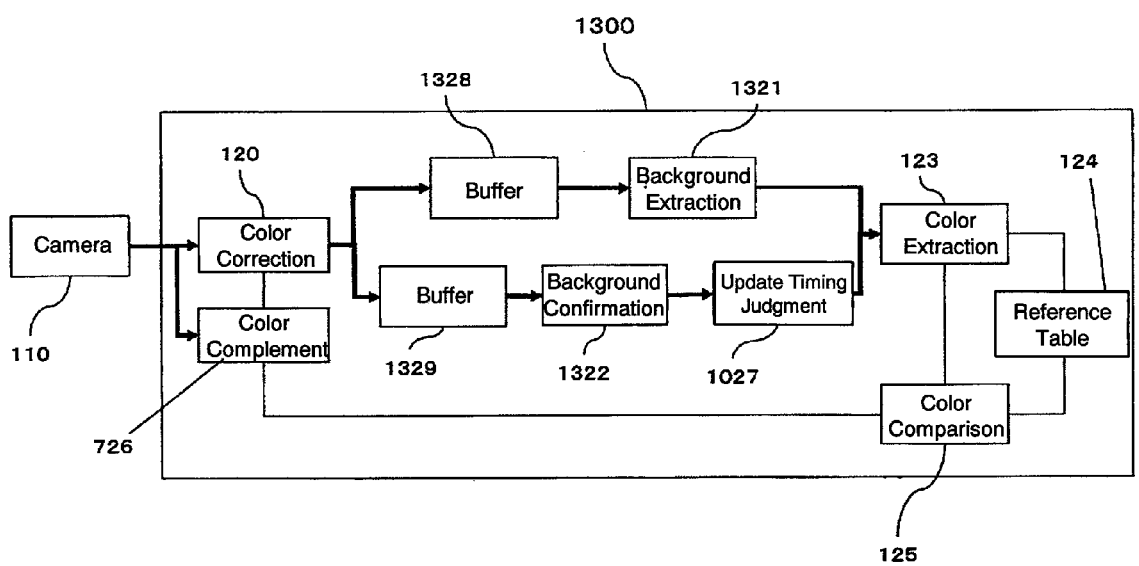
FIG. 28 is a block diagram of a dynamic camera color correction device according to a fourth embodiment of the invention.

A dynamic camera color correction device according to a fourth embodiment of the invention will be described below. FIG. 28 shows the configuration of the dynamic camera color correction device according to the fourth embodiment of the invention. Incidentally, in FIG. 28, parts common with FIGS. 16, 22 and 25 are referred to by the same numerals and description thereof will be described.

In FIG. 28, the dynamic camera color correction device 1300 according to this embodiment includes a background extraction portion 1321, a background confirmation portion 1322, a buffer 1328 and a buffer 1329 in addition to the color correction portion 120, the color extraction portion 123, the reference table 124 and the color comparison portion 125 described in the embodiment 1, the color complement portion 726 described in the embodiment 2 and the update timing judgment portion 1027 described in the embodiment 3.

Figure 29:
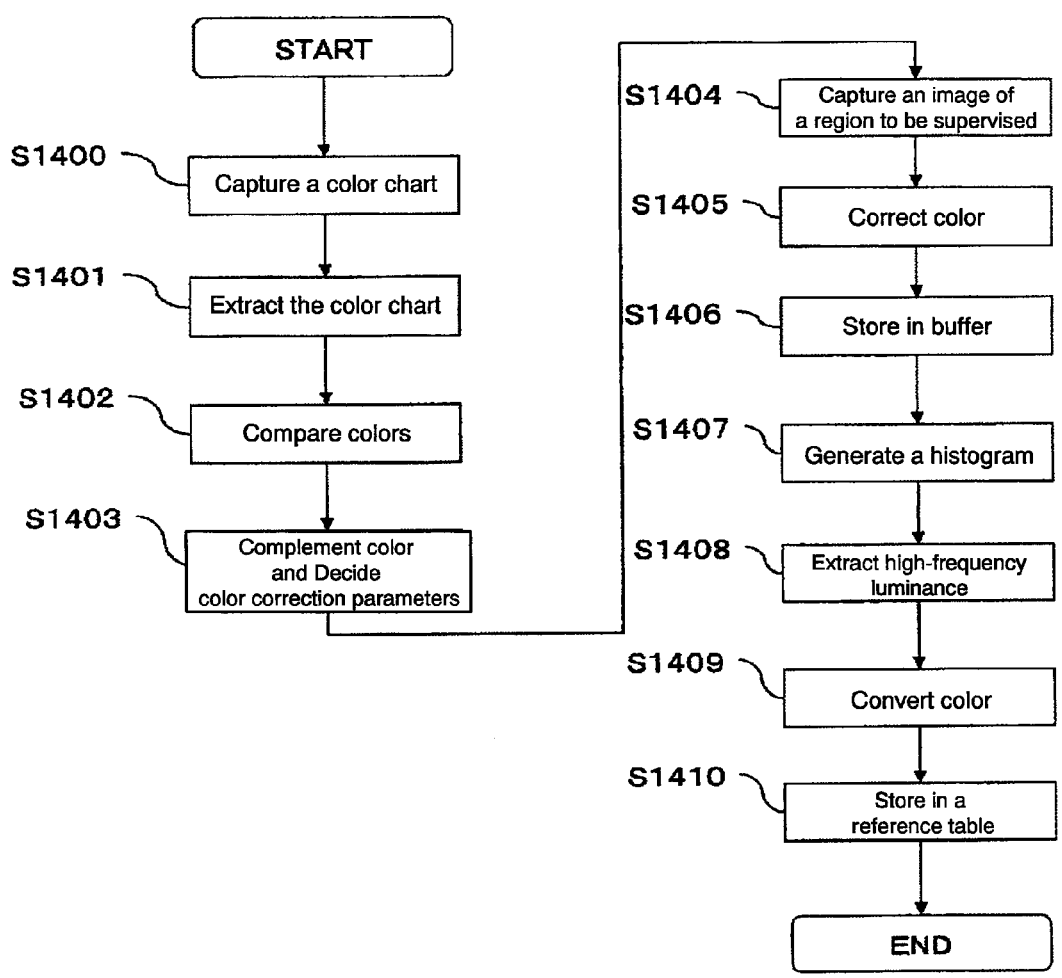
FIG. 29 is a flow chart for explaining the operation of the dynamic camera color correction device according to the fourth embodiment of the invention.

An initial working operation and an ordinary working operation in the dynamic camera color correction device 1300 configured as described above will be described as two kinds of working operations. First, the initial working operation will be described with reference to FIGS. 29 and 30. FIG. 29 is a flow chart for explaining the operation of the dynamic camera color correction device according to the fourth embodiment of the invention. Steps S1400 to S1405 in FIG. 29 are the same as the aforementioned steps S300 to S305 in FIG. 18 and description thereof will be omitted.

Figure 30A:
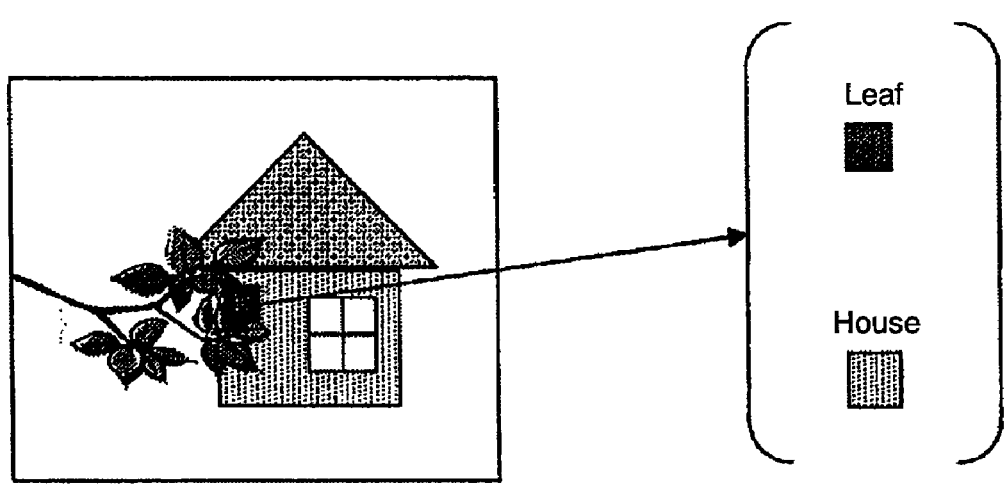
FIG. 30A is an example of a current image and background pixels in the fourth embodiment of the invention.
Figure 30B:
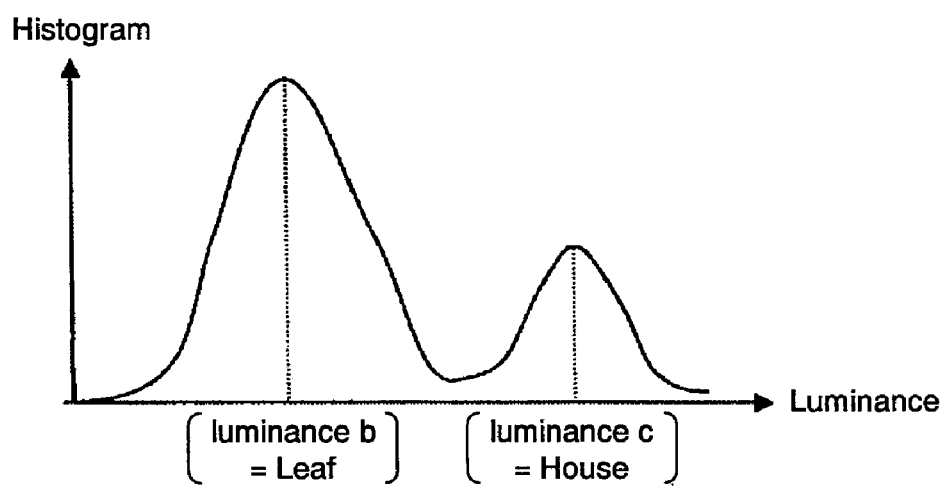
FIG. 30B is an example of a histogram generated in time series with respect to a background pixel.

FIG. 30A is an example of a current image and a background image. FIG. 30B is an example of a histogram generated in time series with respect to each background pixel. When leaves in front of a house as shown in FIG. 30A shake in the wind or the like, two kinds of background colors, i.e. a leaf color and a house color are present in rectangular pixels in FIG. 30A. For this reason, the background extraction portion 1321 need extract such two kinds of background colors.

An example of algorithm for extracting two kinds of background colors will be described below. A photograph image subjected to color correction based on color correction parameters by the color correction portion 120 is stored in the buffer 1328 (S1406). The background extraction portion 1321 generates a histogram (FIG. 30B) in accordance with each pixel in the photograph image stored in time series (S1407). High-frequency luminance b (luminance of the leaves) and luminance c (luminance of the house) are extracted from the generated histogram, for example, by use of a Mixture of Gaussian method or a threshold method (S1408). Although the abscissa axis in FIG. 30B expresses luminance, what can be expressed by the abscissa axis is not limited to luminance and may include color.

The color extraction portion 123 acquires two pieces of color information except a luminance signal such as Y (luminance) or UV (color) from position information and pixel information of each pixel of luminance band luminance c (S1409). The converted color information is stored in the reference table 124 while the two pieces of color information are associated with position information of each pixel (S1410).

Figure 31:
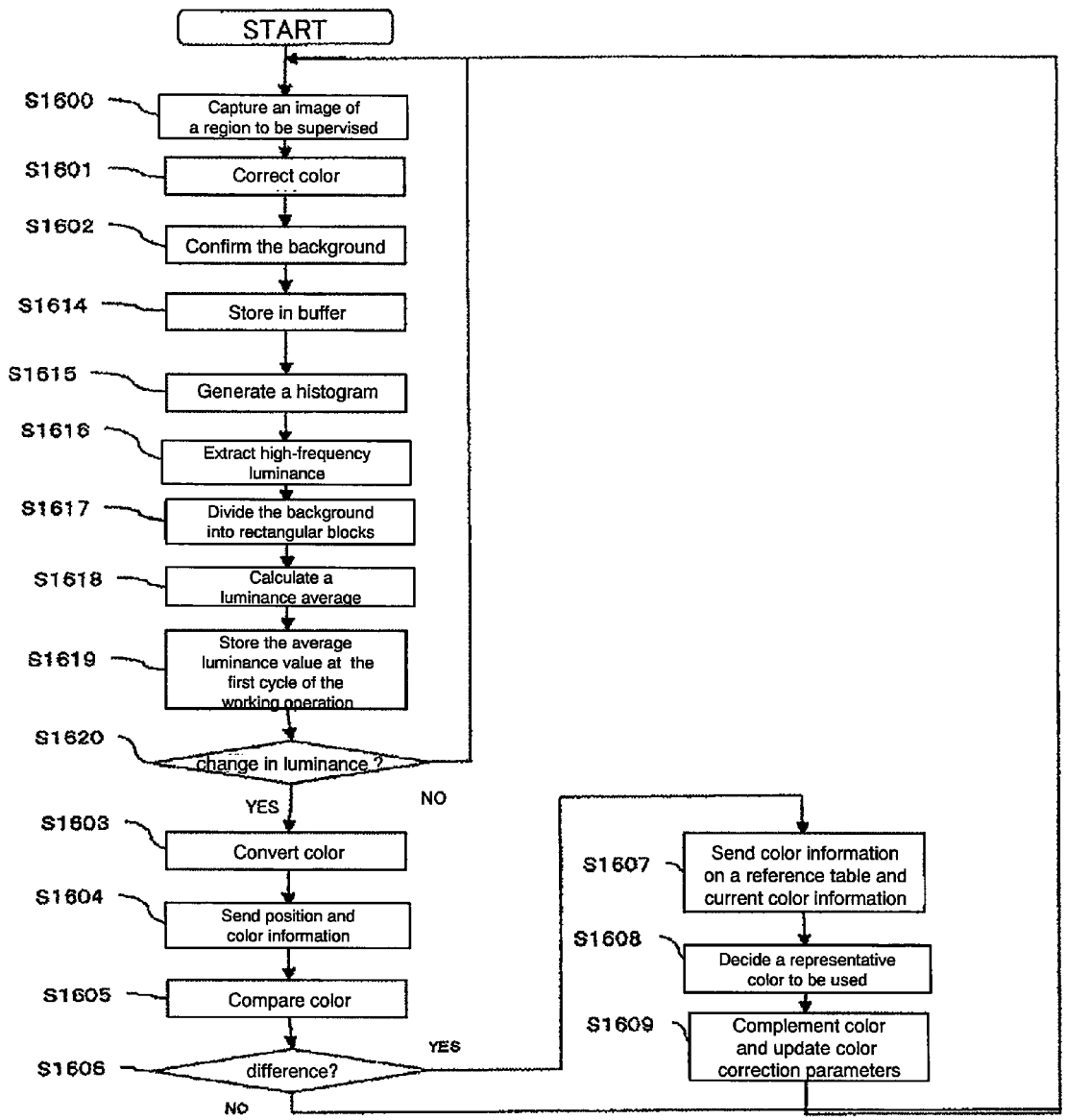
FIG. 31 is a flow chart for explaining the operation of the dynamic camera color correction device according to the fourth embodiment of the invention.

The ordinary working operation will be described next with reference to FIG. 31. FIG. 31 is a flow chart for explaining the operation of the dynamic camera color correction device according to the fourth embodiment of the invention. Steps S1600 to S1609 in FIG. 31 are the same as the aforementioned steps S900 to S909 in FIG. 24 and description thereof will be omitted.

The image of a supervised region photographed by the camera 110 is stored in the buffer 1329 (S1614). The background confirmation portion 1322 generates a histogram (FIG. 30B) in accordance with each pixel in the photograph image stored in time series (S1615). High-frequency luminance b (luminance of the leaves) and luminance c (luminance of the house) are extracted from the generated histogram, for example, by use of a Mixture of Gaussian method or a threshold method (S1616).

The update timing judgment portion 1027 divides the background image into N×M rectangular parts as shown in FIG. 27 (S1617). Incidentally, the case of N=4 and M=4 in which the background image is divided into 16 parts as shown in FIG. 27 is shown as an example and not for limitation of the divisors N and M.

An average of luminance values in each divided region is calculated in accordance with two kinds of regions of luminance b and luminance c (S1618). In the case of the first cycle of the ordinary working operation, an average of luminance values in each region at the first cycle is stored as an average of luminance values at the initial working operation (S1619). Two kinds of averages of luminance values at the initial working operation are compared with two kinds of averages of luminance values in the current frame, respectively, with respect to each divided region (S1620).

When there is a large change in either of the two kinds of compared luminance values (S1620: YES), the situation of the processing goes to steps S1603 to S1609. When there is no large change in both the two kinds of compared luminance values (S1620: NO), the situation of the processing goes back to the step S1600. Although the algorithm for extracting two kinds of background colors has been described, the number of kinds of background colors is not limited to two.

According to such a dynamic camera color correction device according to the fourth embodiment of the invention as described above, a plurality of background pixels are extracted by the background extraction portion 1321 and the background confirmation portion 1322 so that color correction can be performed with high accuracy even when shaking of leaves, a flag or the like occurs.

Fifth Embodiment

Figure 32:
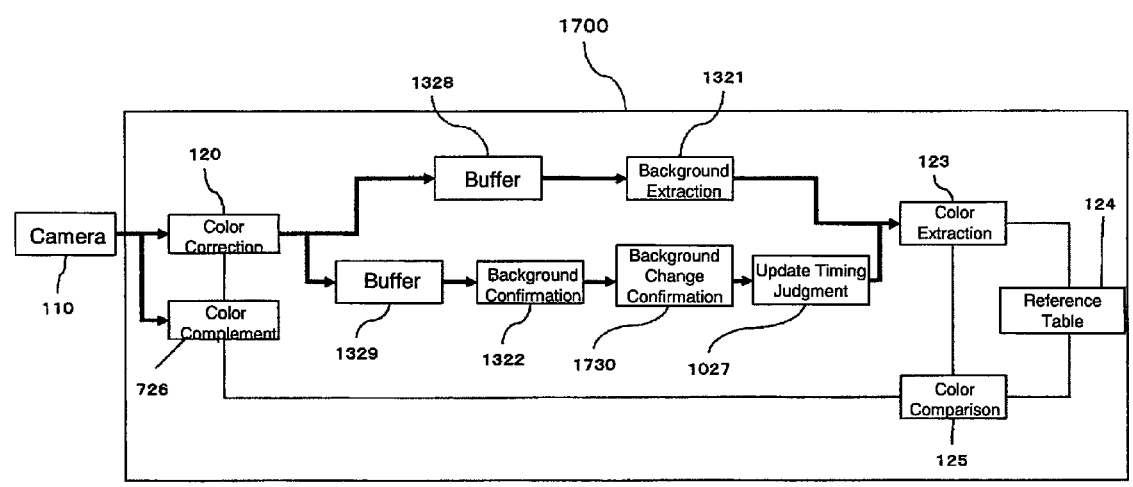
FIG. 32 is a block diagram of a dynamic camera color correction device according to a fifth embodiment of the invention.

A dynamic camera color correction device according to a fifth embodiment of the invention will be described below. FIG. 32 shows the configuration of the dynamic camera color correction device according to the fifth embodiment of the invention. Incidentally, in FIG. 32, parts common with FIGS. 16, 22, 25 and 28 are referred to by the same numerals and description thereof will be omitted.

In FIG. 32, the dynamic camera color correction device 1700 according to this embodiment includes a background change confirmation portion 1730 in addition to the color correction portion 120, the color extraction portion 123, the reference table 124 and the color comparison portion 125 described in the embodiment 1, the color complement portion 726 described in the embodiment 2, the update timing judgment portion 1027 described in the embodiment 3 and the background extraction portion 1321, the background confirmation portion 1322, the buffer 1328 and the buffer 1329 described in the embodiment 4.

An initial working operation and an ordinary working operation in the dynamic camera color correction device 1700 configured as described above will be described as two kinds of working operations. The initial working operation is the same as the aforementioned steps S1400 to S1410 in FIG. 29 and description thereof will be omitted.

Figure 33:
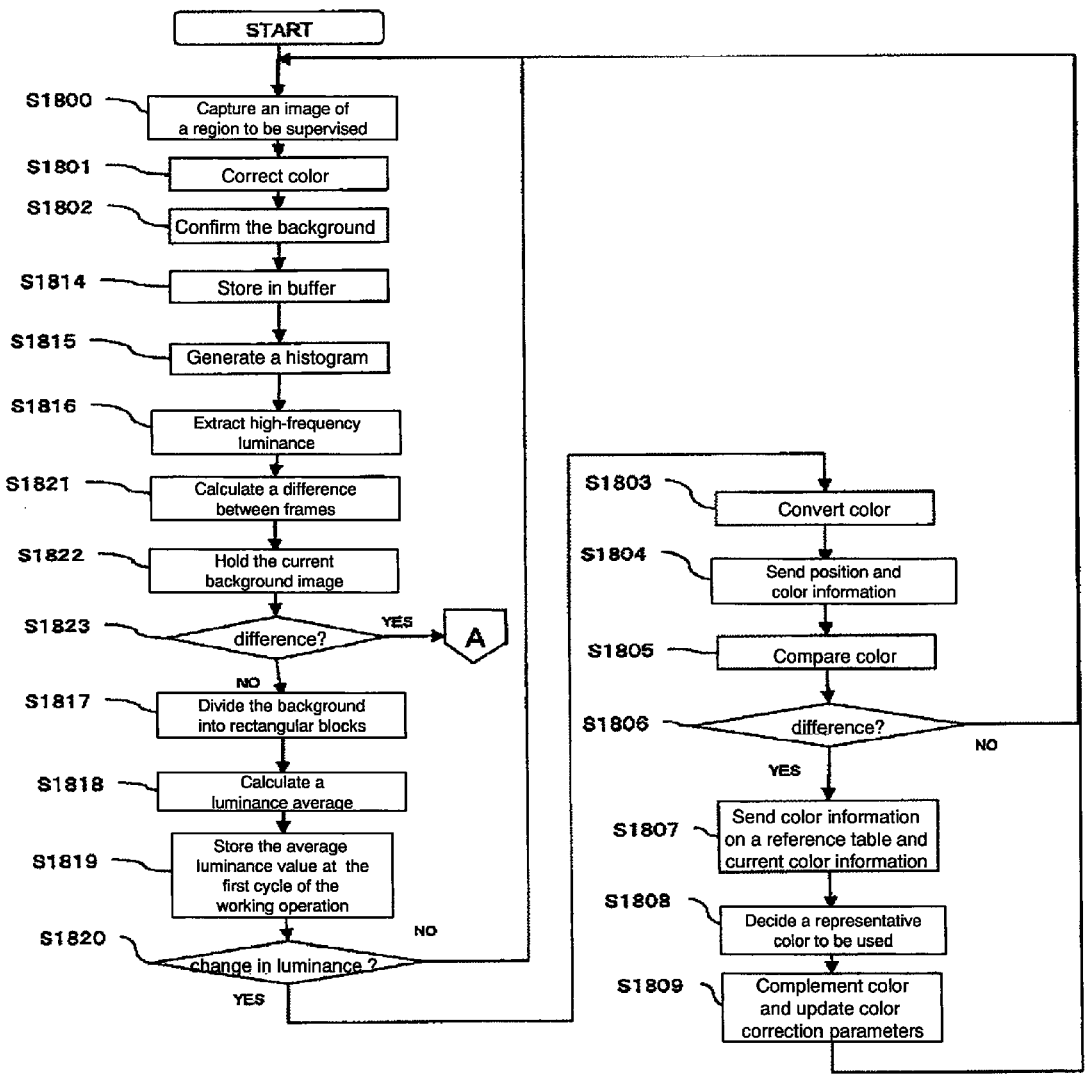
FIG. 33 is a flow chart for explaining the operation of the dynamic camera color correction device according to the fifth embodiment of the invention.
Figure 34:
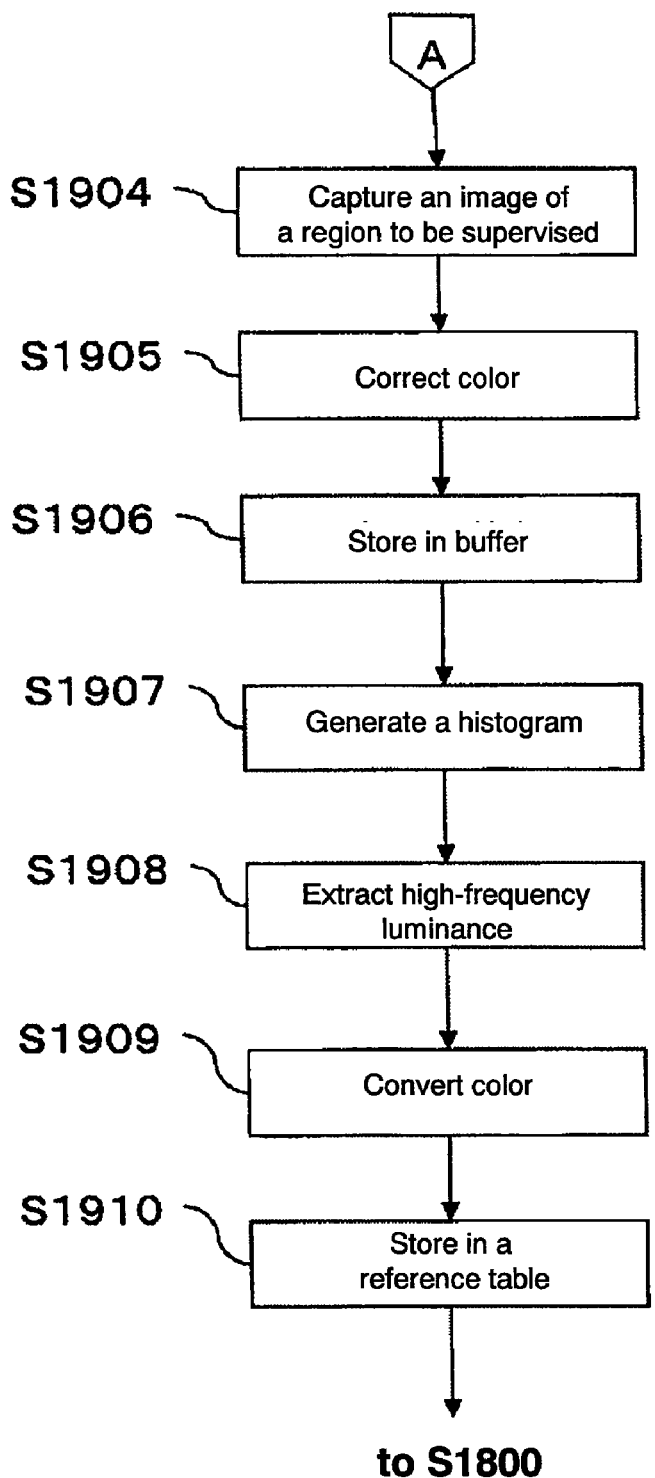
FIG. 34 is a flow chart for explaining the operation of the dynamic camera color correction device according to the fifth embodiment of the invention.

The ordinary working operation will be described with reference to FIGS. 33 and 34. FIGS. 33 and 34 are flow charts for explaining the operation of the dynamic camera color correction device according to the fifth embodiment of the invention. Steps S1800 to S1820 in FIG. 33 are the same as the aforementioned steps S1600 to S1620 in FIG. 31 and description thereof will be omitted.

The background image (group) extracted by the background confirmation portion 1322 is sent to the background change confirmation portion 1730. The background change confirmation portion 1730 calculates a difference between the background image (group) in the current frame and the background image (group) in a frame just previous to the current frame (S1821).

The background change confirmation portion 1730 overwrites the background image (group) of the current frame on the background image (group) of the frame just previous to the current frame (S1822). When a result of the difference is large (S1823: YES), the situation of the processing goes to steps S1904 to S1910 (see FIG. 34).

The steps S1904 to S1910 in FIG. 34 are the same as the aforementioned steps S1404 to S1410 in FIG. 29 and description thereof will be omitted. When a result of the difference is not large (S1823: NO), the situation of the processing goes to a process of steps S1817 to S1820 and steps S1803 to S1809.

According to such a dynamic camera color correction device according to the fifth embodiment of the invention, the background change confirmation portion 1730 compares the background image (group) of the current frame with the background image (group) of the frame just previous to the current frame so that color correction can be performed with high accuracy even when a parked car or the like contained in the background image moves.

Sixth Embodiment

Figure 35:
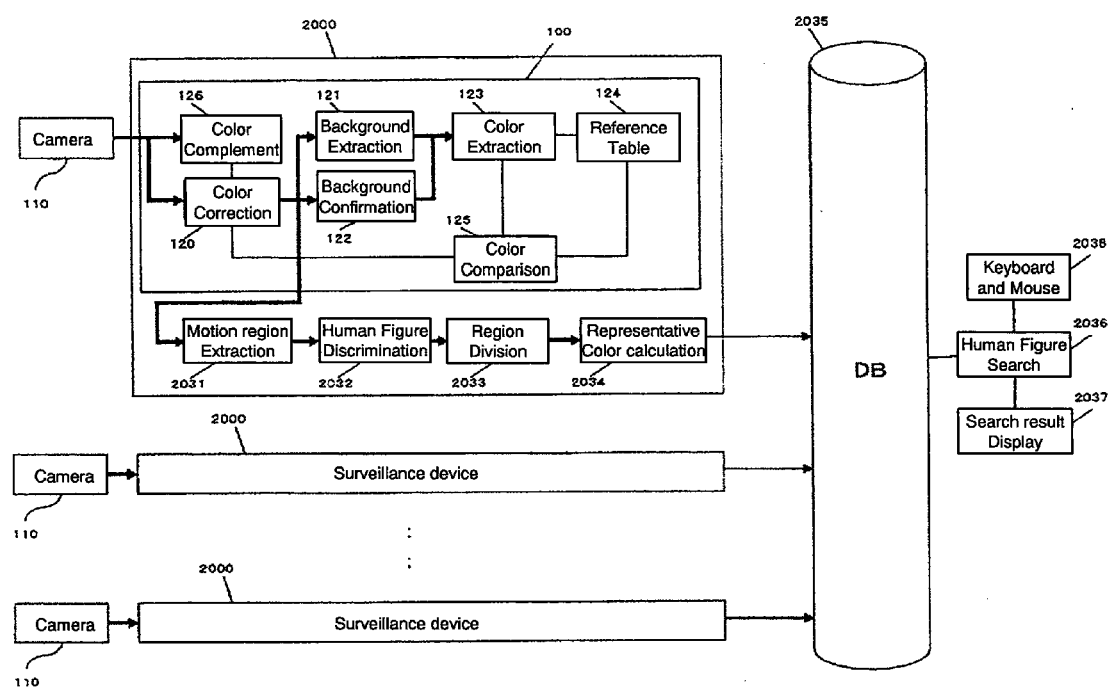
FIG. 35 is a block diagram of a video search device including dynamic camera color correction devices according to a sixth embodiment of the invention.

A video search device including dynamic camera color correction devices according to a sixth embodiment of the invention will be described below. FIG. 35 shows the configuration of the video search device including the dynamic camera color correction devices according to the sixth embodiment of the invention. Incidentally, in FIG. 35, parts common with FIG. 16 are referred to by the same numerals and description thereof will be omitted.

In FIG. 35, the video search device according to this embodiment includes cameras 110, surveillance devices 2000, a database (DB) 2035, a human figure search portion 2036, a search result display portion 2037, and a keyboard and mouse 2038.

Each of the surveillance devices 2000 includes the aforementioned dynamic camera color correction device 100 according to the embodiment 1, a motion region extraction portion 2031, a human figure discrimination portion 2032, a region division portion 2033, and a representative color calculation portion 2034.

Figure 36:
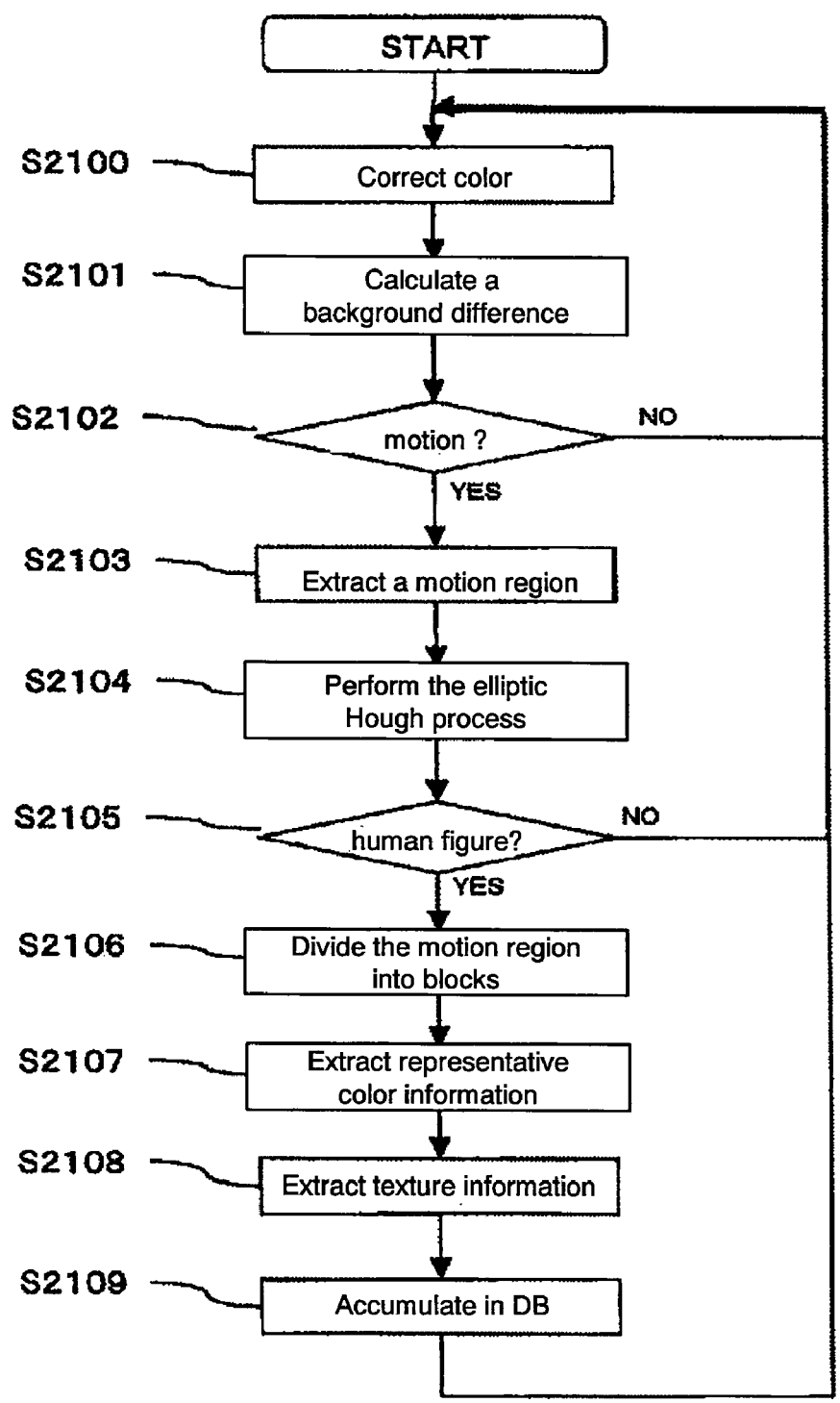
FIG. 36 is a flow chart for explaining the operation of the video search device including the dynamic camera color correction devices according to the sixth embodiment of the invention.
Figure 37:
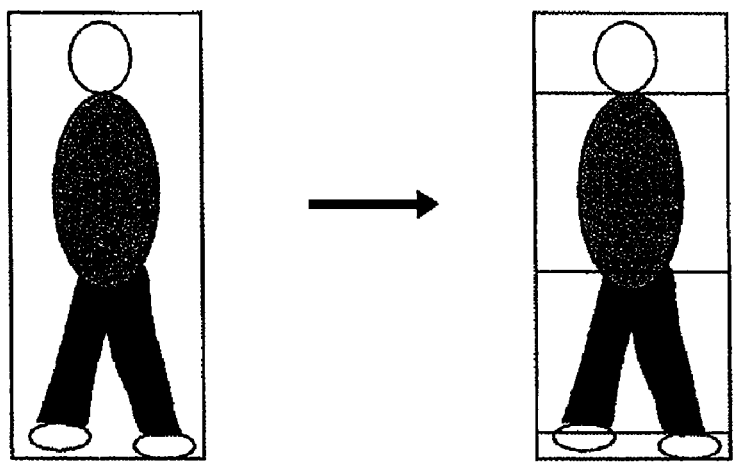
FIG. 37 is a schematic view for explaining the operation of the video search device including the dynamic camera color correction devices according to the sixth embodiment of the invention.

An accumulating operation and a searching operation in the video search device of the embodiment 6 configured as described above will be described. First, the accumulating operation will be described with reference to FIGS. 36 and 37. FIG. 36 is a flow chart for explaining the operation of the video search device including the dynamic camera color correction devices according to the sixth embodiment of the invention. FIG. 37 is an explanatory view thereof. Incidentally, the operation of each dynamic camera color correction device 100 is the same as the aforementioned operation in the embodiment 1 and description thereof will be omitted.

A photograph image processed by the color correction portion 120 is inputted to the motion region extraction portion 2031 (S2100). The motion region extraction portion 2031 performs a background difference process for calculating a difference value between the inputted photograph image and a background image held in advance (S2101).

Then, the motion region extraction portion 2031 judges whether or not there is motion in the photograph image (S2102). Specifically, the motion region extraction portion 2031 judges that there is motion in video when the difference value in the background difference process is larger than a predetermined value in S2102. The motion region extraction portion 2031 judges that there is no motion in the image when the difference value is not larger than the predetermined value.

Incidentally, the motion region extraction portion 2031 may be configured so that a process other than the background difference process is performed in S2101 and a judgment is made in S2102 as to whether or not there is motion in the image, in accordance with a result of the other process than the background difference process.

When there is motion in video corresponding to the photograph image inputted to the motion region extraction portion 2031, the motion region extraction portion 2031 extracts a motion region in the video (S2103). Further, the motion region extraction portion 2031 outputs the photograph image of the motion region to the human figure discrimination portion 2032.

Upon reception of the photograph image of the motion region from the motion region extraction portion 2031, the human figure discrimination portion 2032 performs an elliptic Hough process (S2104). Then, the human figure discrimination portion 2032 judges whether or not the condition that the photograph image of the motion region is a human figure is satisfied (S2105).

Specifically, when an elliptic region like a human face can be detected in the motion region by the elliptic Hough process in S2104, the human figure discrimination portion 2032 judges that the condition that the motion region is a human figure is satisfied. On the other hand, when an elliptic region like a human face cannot be detected, the human figure discrimination portion 2032 judges that the condition that the motion region is a human figure is not satisfied.

Incidentally, the human figure discrimination portion 2032 may be configured so that a process (e.g. a process of deriving the whole shape, size, etc. of the motion region to be accumulated) other than the elliptic Hough process is performed in S2104 and a judgment is made in S2105 as to whether or not the condition that the motion region is a human figure, in accordance with a result of the other process than the elliptic Hough process.

When the condition that the motion region is a human figure is not satisfied (S2105: NO), the situation of the processing goes back to the step S2100. When the condition that the motion region is a human figure is satisfied (S2105: YES), the human figure discrimination portion 2032 outputs the photograph image of the motion region to the region division portion 2033.

The region division portion 2033 divides the photograph image of the motion region from the human figure discrimination portion 2032 into a plurality of block regions (S2106). For example, the region division portion 2033 divides the photograph image into the four of a head, an upper body, a lower body and shoes as shown in FIG. 37. The dividing algorithm may be a K-Mean method or a repetitive region extension method. Incidentally, the divisor for dividing the motion region, the shape of each block region and the dividing algorithm are not limited particularly.

The region division portion 2033 outputs a photograph image corresponding to each divided block region to the representative color calculation portion 2034. The representative color calculation portion 2034 calculates a representative color of each block region by a predetermined color conversion algorithm (e.g. converting an RGB color system into an HSV color system, a Lab color system or a YUV color system) (S2107). For example, an average or modal value of colors or the whole of a histogram in each region may be used.

Further, the representative color calculation portion 2034 acquires texture information of each block region (S2108). For example, a space-frequency analyzing method due to two-dimensional Gabor transformation or an edge histogram in a vertical, horizontal or oblique direction may be used.

Then, the representative color calculation portion 2034 outputs representative color information and texture information to DB 2035. DB 2035 accumulates representative color information and texture information (S2109). Incidentally, DB 2035 may be configured so that the identification number of the camera 110 picking up an image, photograph date and time and a thumbnail image are accumulated while associated with the representative color information and the texture information.

By repeating the process of the aforementioned steps S2100 to S2109, representative color information and texture information corresponding to a plurality of human figures are accumulated in DB 2035.

Figure 38:
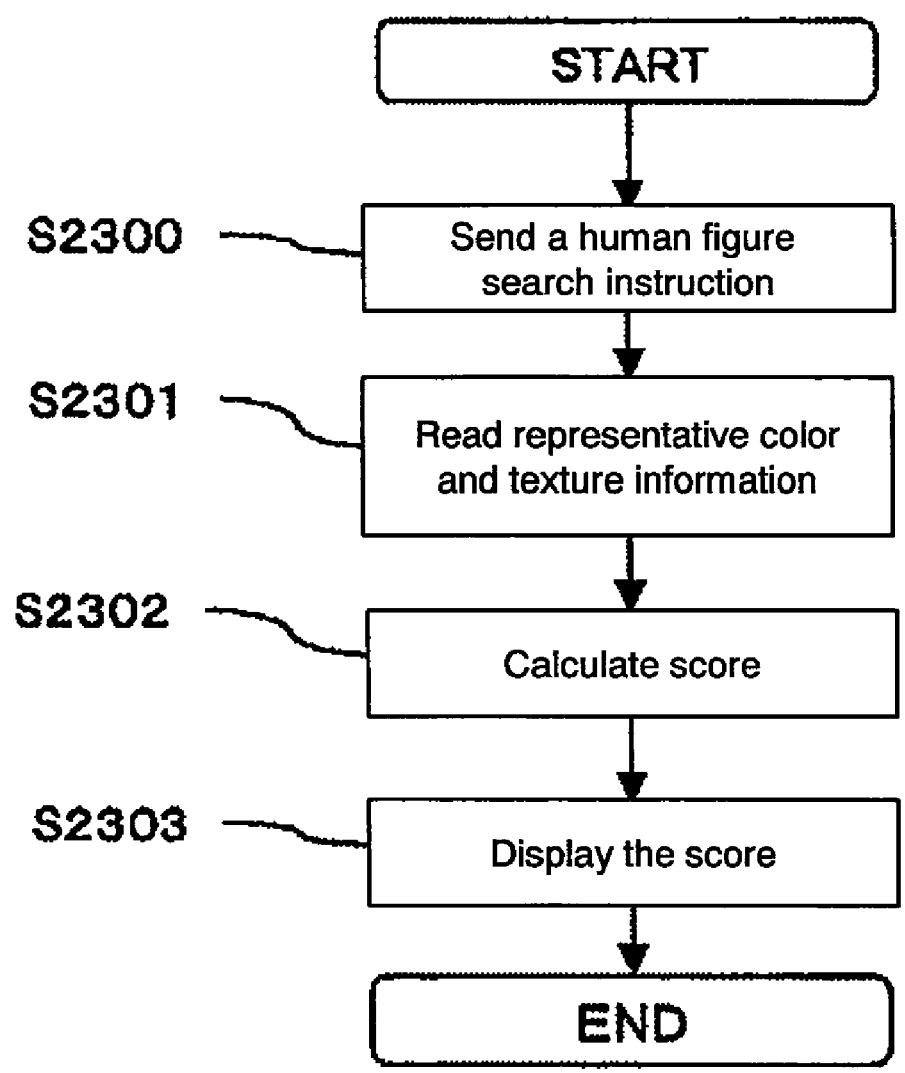
FIG. 38 is a flow chart for explaining the operation of the video search device including the dynamic camera color correction devices according to the sixth embodiment of the invention.

A searching operation will be described next with reference to FIG. 38. FIG. 38 is a flow chart for explaining the operation of the video search device including the dynamic camera color correction devices according to the sixth embodiment of the invention.

First, a user sends a human figure search instruction to the human figure search portion 2036 through the keyboard and mouse 2038 (S2300). For example, the human figure search instruction may use thumbnail images accumulated in DB 2035 or may use perceptual representative 11 colors such as red, blue and yellow, date and time or the identification number of the camera 110.

Further, narrow search i.e. search for a human figure having an upper body of red and a lower body of black and white striped texture and photographed by camera No. 1 in a period of 10:10 Nov. 11, 2005 to 20:45 Nov. 11, 2005 may be performed.

Upon reception of the human figure search instruction, the human figure search portion 2036 reads representative color information and texture information corresponding to a human figure corresponding to the human figure search instruction from DB 2035 (S2301). For example, when a human figure of camera No. 1 and a human figure search instruction are issued, a human figure photographed by camera No. 2 is not read.

Then, the human figure search portion 2036 performs score calculation of representative color information and texture information corresponding to the read human figure along the human figure search instruction (S2302). For example, assume that representative color information and texture information of human figures A, B and C are read from DB 2035. Further, assume that the human figure search instruction is to find a human figure having a color similar to the color of the upper body of human figure D.

When color information of the upper body of human figure A is represented by two-dimensional coordinates (A1, A2), color information of the upper body of human figure B is represented by two-dimensional coordinates (B1, B2), color information of the upper body of human figure C is represented by two-dimensional coordinates (C1, C2) and color information of the upper body of human figure D is represented by two-dimensional coordinates (D1, D2), Euclidean distances between the coordinates of D and the coordinates of A, B and C are calculated. Incidentally, score calculation may be made by a method other than the Euclidean distance.

Then, for example, the search result display portion 2037 displays thumbnail images in order of score calculated by the human figure search portion 2036 (S2303). Incidentally, the surveillance device 2000 may have the dynamic camera color correction device 700 of the embodiment 2, the dynamic camera color correction device 900 of the embodiment 3, the dynamic camera color correction device 1300 of the embodiment 4 or the dynamic camera color correction device 1700 of the embodiment 5 in place of the dynamic camera color correction device 100.

Incidentally, in the surveillance device 2000 of this embodiment, the dynamic camera color correction device 100 may be incorporated in the inside of the camera 110. Further, the motion region extraction portion 2031, the human figure discrimination portion 2032, the region division portion 2033 and the representative color calculation portion 2034 in the surveillance device 2000 of this embodiment 6 may be incorporated in the inside of the camera 110.

According to the embodiment 6 of the invention as described above, color correction is performed dynamically by the dynamic camera color correction device 100 so that human figure search can be made with high accuracy without influence of an individual difference between cameras, a change of sunshine, etc.

Seventh Embodiment

Figure 39:
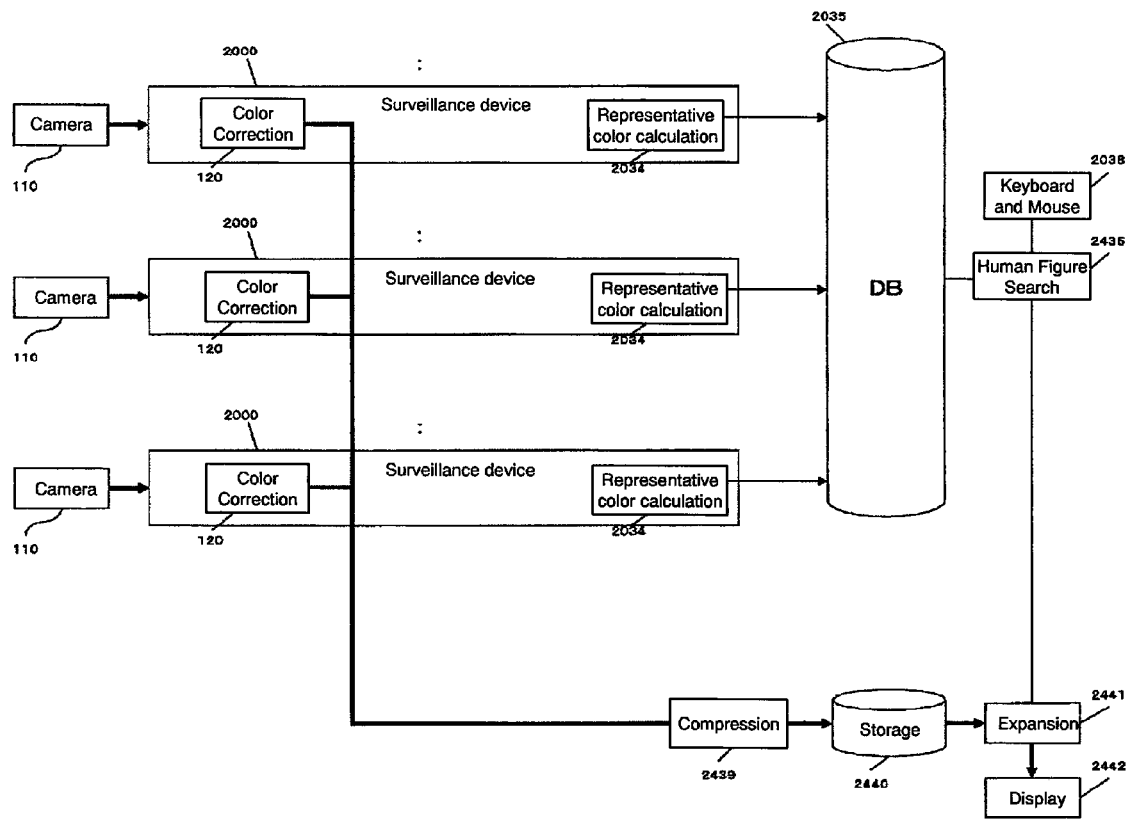
FIG. 39 is a block diagram of a video search device including dynamic camera color correction devices according to a seventh embodiment of the invention.

A video search device including dynamic camera color correction devices according to a seventh embodiment of the invention will be described below. FIG. 39 shows the configuration of the video search device including the dynamic camera color correction devices according to the seventh embodiment of the invention. Incidentally, in FIG. 39, parts common with FIGS. 16 and 35 are referred to by the same numerals and description thereof will be omitted.

In FIG. 39, the video search device according to this embodiment includes a compression portion 2439, a storage 2440, an expansion portion 2441 and a display portion 2442 in addition to the cameras 110 and the surveillance devices 2000, the DB 2035, the human figure search portion 2036 and the keyboard and mouse 2038 described in the embodiment 6.

Each of the surveillance devices 2000 includes the dynamic camera color correction device 100 according to the embodiment 1 and the motion region extraction portion 2031, the human figure discrimination portion 2032, the region division portion 2033 and the representative color calculation portion 2034 according to the embodiment 6.

A DB accumulating operation, a storage accumulating operation and a display operation in the video search device of the seventh embodiment configured as described above will be described. The accumulating operation is the same as the aforementioned steps S2100 to S2109 in FIG. 36 and description thereof will be omitted.

Figure 40:
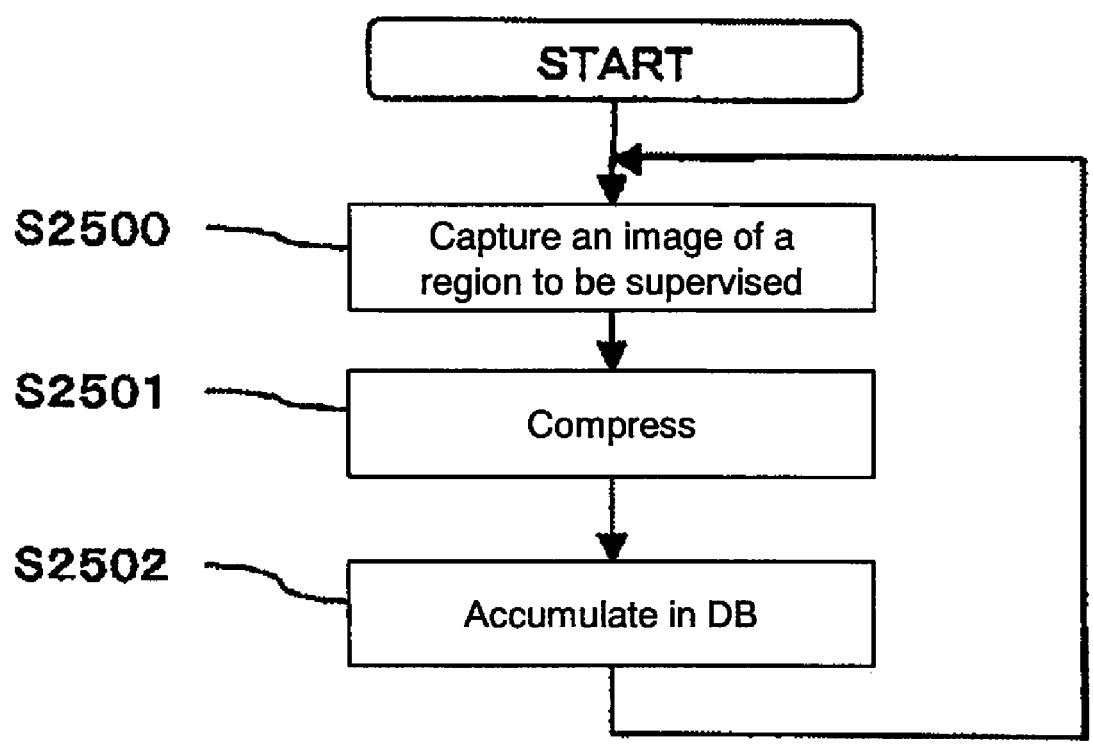
FIG. 40 is a flow chart for explaining the operation of the video search device including the dynamic camera color correction devices according to the seventh embodiment of the invention.

The storage accumulating operation will be described with reference to FIG. 40. FIG. 40 is a flow chart for explaining the operation of the video search device including the dynamic camera color correction devices in the seventh embodiment of the invention.

The color correction portion 120 outputs a color-corrected photograph image to the compression portion 2439 (S2500). The compression portion 2439 compresses the photograph image in a predetermined compression method (S2501), so that the compressed photograph image is accumulated in the storage 2440 (S2502). For example, an MPEG (Moving Picture Experts Group) method, a JPEG (Joint Photographic Experts Group) method or the like is used as the predetermined compression method.

Incidentally, the identification number of the camera 110 photographing the image and the date and time of photographing may be accumulated in the storage 2440 while associated with the compressed image. By repeating the aforementioned process of the steps S2500 to S2502, the photograph image is stored in the storage 2440.

Figure 41:
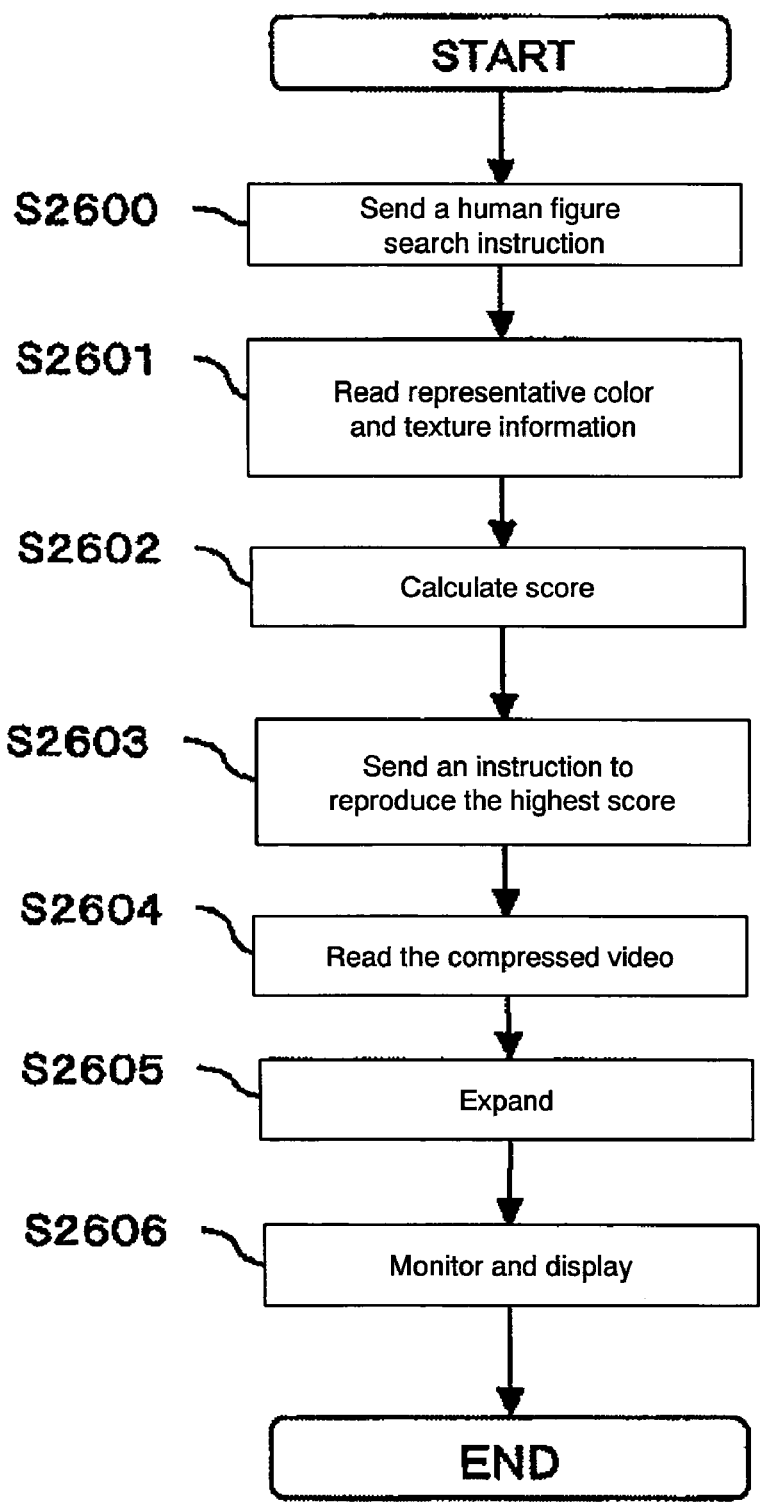
FIG. 41 is a flow chart for explaining the operation of the video search device including the dynamic camera color correction devices according to the seventh embodiment of the invention.

The display operation will be described with reference to FIG. 41. FIG. 41 is a flow chart for explaining the operation of the video search device including the dynamic camera color correction devices according to the seventh embodiment of the invention. Steps S2600 to S2602 in FIG. 41 are the same as the aforementioned steps S2300 to S2302 in FIG. 38 and description thereof will be omitted.

A human figure reproduction instruction is sent to the expansion portion 2441 to reproduce an image of a human figure of the highest score calculated by the human figure search portion 2036 (S2603). For example, when the highest score is a human figure photographed by camera No. 1 under 10:10:00 Nov. 11, 2005, the human figure reproduction instruction is an instruction to expand the compressed image of camera No. 1 in a range of 10:10:00 Nov. 11, 2005 to 10:11:00 Nov. 11, 2005.

The expansion portion 2441 reads the compressed image from the storage 2440 in accordance with the human figure reproduction instruction (S2604) and expands the compressed image in a predetermined expansion method (S2605). The predetermined expansion method described herein is an expansion method corresponding to the compression method used in the compression portion 2439. The expanded image is displayed on the display portion 2442 (S2606).

Incidentally, the surveillance device 2000 may have the dynamic camera color correction device 700 in the embodiment 2, the dynamic camera color correction device 900 in the embodiment 3, the dynamic camera color correction device 1300 in the embodiment 4 or the dynamic camera color correction device 1700 in the embodiment 5 in place of the dynamic camera color correction device 100.

In the compression portion 2439, a frame to be compressed may be selected and intermittently compressed so that the quantity of data to be used can be reduced. Further, the dynamic camera color correction portion 100 may be incorporated in the inside of the camera 110. Further, the motion region extraction portion 2031, the human figure discrimination portion 2032, the region division portion 2033 and the representative color calculation portion 2034 may be incorporated in the inside of the camera 110.

According to the seventh embodiment of the invention as described above, video of a required human figure can be reproduced without influence of an individual difference between cameras, a change of sunshine, etc. by a method in which: color correction is performed dynamically by the dynamic camera color correction device 100; the color-corrected video is accumulated in the storage 2440; and the video is displayed on the display portion 2442.

Eighth Embodiment

Figure 42:
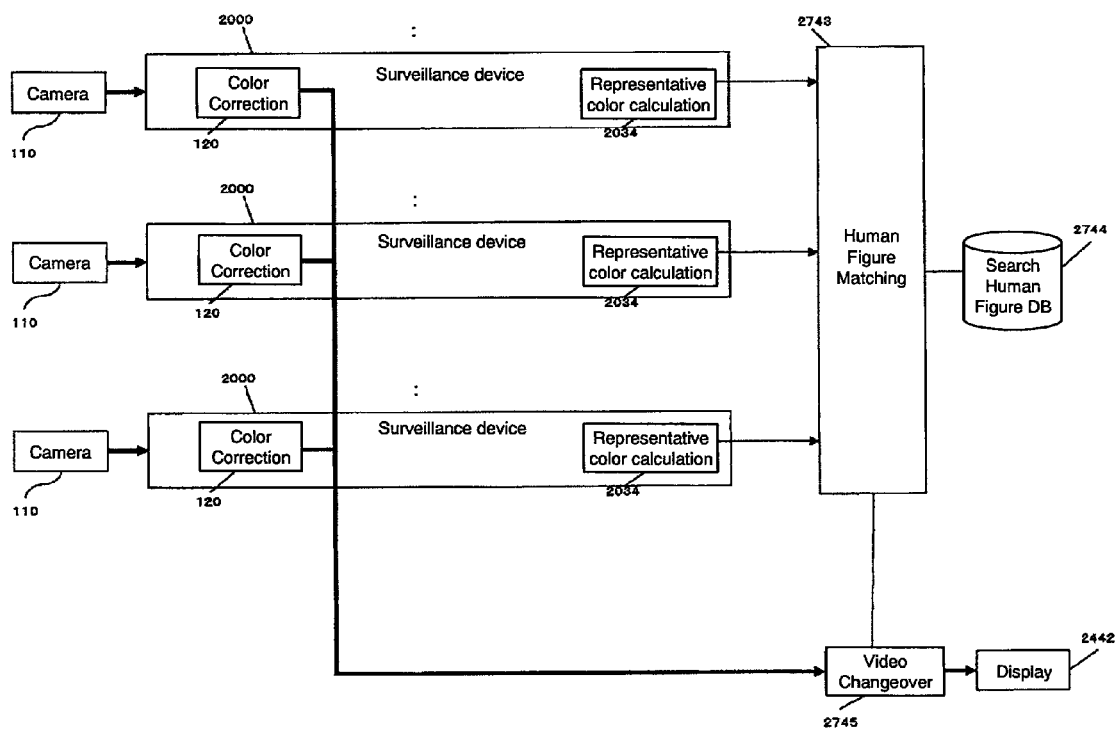
FIG. 42 is a block diagram of a video search device including dynamic camera color correction devices according to an eighth embodiment of the invention.

A video search device including dynamic camera color correction devices according to an eighth embodiment of the invention will be described below. FIG. 42 shows the configuration of the video search device including the dynamic camera color correction devices according to the eighth embodiment of the invention. Incidentally, in FIG. 42, parts common with FIGS. 16, 35 and 39 are referred to by the same numerals and description thereof will be omitted.

In FIG. 42, the video search device according to this embodiment includes a human figure matching portion 2743 and a video changeover portion 2745 in addition to the cameras 110 and the surveillance devices 2000 and the display portion 2442 described in the embodiment 6.

Each of the surveillance devices 2000 includes the dynamic camera color correction device 100 according to the embodiment 1 and the motion region extraction portion 2031, the human figure discrimination portion 2032, the region division portion 2033 and the representative color calculation portion 2034 according to the embodiment 6.

Figure 43:
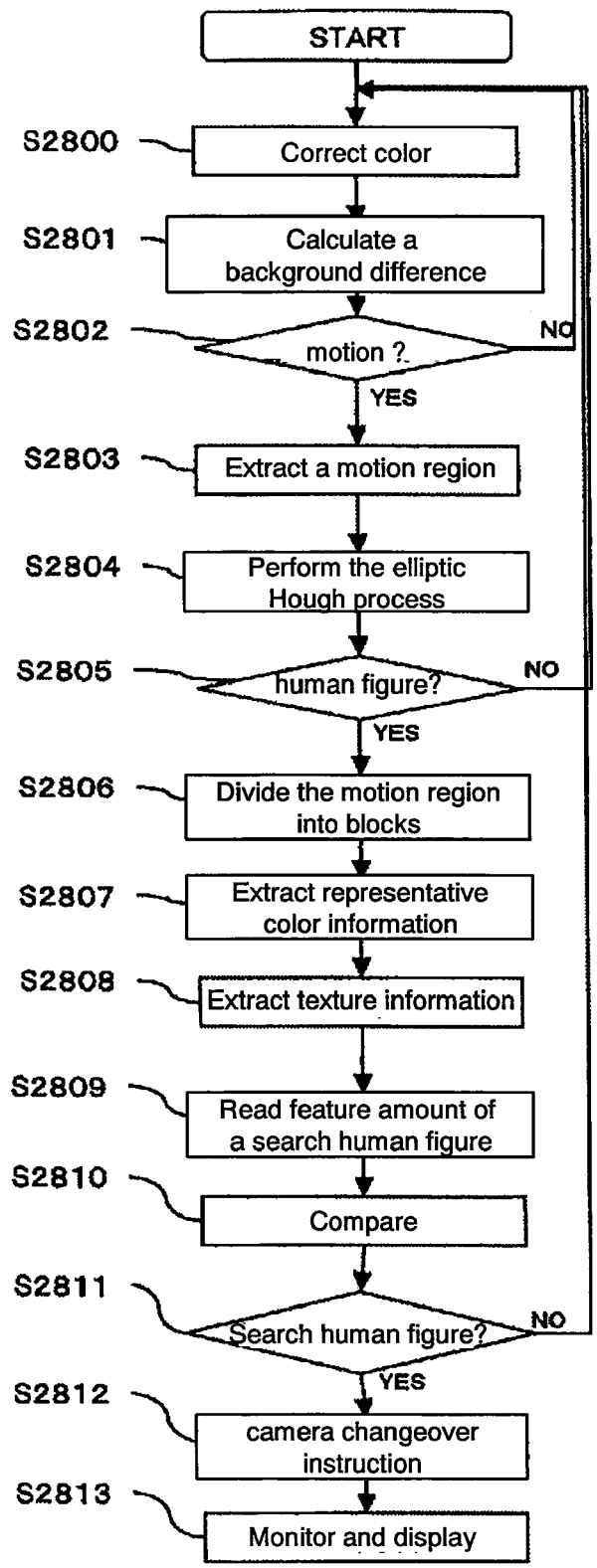
FIG. 43 is a flow chart for explaining the operation of the video search device including the dynamic camera color correction devices according to the eighth embodiment of the invention.

The video search device of the embodiment 8 configured as described above will be described with reference to FIG. 43. FIG. 43 is a flow chart for explaining the operation of the video search device including the dynamic camera color correction devices according to the eighth embodiment of the invention. Steps S2800 to S2808 in FIG. 43 are the same as the aforementioned steps S2100 to S2108 in FIG. 36 and description thereof will be omitted.

Representative color information and texture information of a human figure generated by the representative color calculation portion 2034 are sent to the human figure matching portion 2743. On the other hand, representative color information and texture information of a specific human figure are stored in the search human figure DB 2744 in advance.

The human figure matching portion 2743 reads the representative color information and texture information stored in the search human figure DB 2744 (S2809). The human figure matching portion 2743 compares the representative color information and texture information sent from the representative color calculation portion 2034 with the representative color information and texture information read from the search human figure DB 2744 (S2810) and judges whether the two are of the same human figure. For example, the Euclidean distance described in the aforementioned score calculation (see S2302) may be used as the comparison method.

When the two are of the same human figure (S2811: YES), a camera changeover instruction is sent to the video changeover portion 2745 to monitor and display the video of the human figure on a camera identification number corresponding to the representative color calculation portion 2034 used for generating the representative color information and texture information of the human figure (S2812). The changed photograph image is displayed on the display portion 2442 (S2813). When the two are not of the same human figure (S2811: NO), the situation of the processing goes back to the step S2800.

Incidentally, the surveillance device 2000 may have the dynamic camera color correction device 700 in the embodiment 2, the dynamic camera color correction device 900 in the embodiment 3, the dynamic camera color correction device 1300 in the embodiment 4 or the dynamic camera color correction device 1700 in the embodiment 5 in place of the dynamic camera color correction device 100.

Further, the dynamic camera color correction portion 100 may be incorporated in the inside of the camera 110. Further, the motion region extraction portion 2031, the human figure discrimination portion 2032, the region division portion 2033 and the representative color calculation portion 2034 may be incorporated in the inside of the camera 110.

According to the eighth embodiment of the invention as described above, even when a required human figure moves between cameras, the required human figure can be monitored without influence of an individual difference between cameras, a change of sunshine, etc. by a method in which: color correction is performed dynamically by the dynamic camera color correction device 100; comparison is performed by the human figure matching portion 2743 as to whether or not the human figure is the same as the human figure stored in the search human figure DB 2744; and the camera is changed over by the video changeover portion 2745 when the two are of the same human figure.

Although preferred embodiments of the present invention conceivable at the current time have been described above, it is to be understood that various modifications may be made on the embodiments and it is to be intended that all modifications within the true spirit and scope of the invention may be included in the scope of accompanying claims.

INDUSTRIAL APPLICABILITY

As described above, the color correction device according to the invention (first invention) has an effect that the necessity of holding color set information unnecessary for color correction can be eliminated so that it is possible to reduce the load imposed on calculation and adapt to a change of lighting environment in real time. This is useful as a color correction device or the like used in a tracking and surveillance system or the like.

Further as described above, the invention (second invention) has an effect that the color of an image can be corrected appropriately without influence of a change of photograph environment such as camera installation environment and sunshine environment. This is useful for a dynamic camera color correction device and a video search device or the like using the dynamic camera color correction device.

The invention claimed is:
1. A color correction device comprising:
color set information storage portion which stores color set information containing color information of a source color as a subject of color correction and color information of a reference color after color correction;
color correction portion which corrects a color in a range similar to the source color, in each of source images picked up by a plurality of image pickup devices, to the reference color by using the color set;

region selection portion which selects a specific source region from each of the source images;

region color decision portion which decides a source region color as a representative color of the source region; and color set update portion which updates the source color of the color set by using the source region color.

2. A color correction device according to claim 1, wherein;

the region selection portion comprises a source object extraction portion which extracts a foreground object moving in a background image as a source object from the source image;

the region color decision portion comprises an object color decision portion which decides an average color of the source object as an object color which is the source region color;

the color correction device further comprises an object similarity judgment portion which judges whether or not the source object is similar to a predetermined reference object; and the color set update portion updates the source color of the color set by using the object color of the source object when a judgment is made that the source object is similar to the reference object.

3. A color correction device according to claim 2, wherein;

the object similarity judgment portion compares feature amounts of the source object and the reference object to thereby judge similarity between the source object and the reference object.

4. A color correction device according to claim 2, wherein;

the color set update portion uses a weighted average color obtained by a process of weighted-averaging the object color of the source object and the source color of the color set, as a source color for updating.

5. A color correction device according to claim 1, wherein;

the color set information storage portion stores color set information containing region information from which color information of the source color is acquired;

the region selection portion comprises a background image acquisition portion which acquires a background image from the plurality of source images, and a corresponding region search portion which searches the background image for a corresponding region corresponding to the region information of the source color;

the region color decision portion comprises a corresponding region color decision portion which decides an average color of the corresponding region as a corresponding region color which is the source region color;

the color correction device further comprises a lighting change detection portion which detects a change of lighting environment in the source image based on the corresponding region color; and the color set update portion updates the source color of the color set by using the corresponding region color when a judgment is made that there is a change in lighting environment.

6. A color correction device according to claim 5, wherein the lighting change detection portion comprises:

a color distance calculation portion which calculates a color distance between the corresponding region color and the source color; and a lighting change judgment portion which judges that there is a change in lighting environment when the color distance between the corresponding region color and the source color is larger than a predetermined threshold color distance.

7. A color correction device according to claim 5, wherein;

the background image acquisition portion acquires the background image from the plurality of source images at intervals of a predetermined time; and the lighting change detection portion detects a change of lighting environment in the source image at intervals of the predetermined time.

8. A color correction device according to claim 5, wherein;

the color correction portion comprises a region division portion which divides the corresponding region into a plurality of small regions; and corrects a color in a range similar to the source color to the reference color in accordance with each of the small regions.

9. A color correction method comprising:

storing color set information containing color information of a source color as a subject of color correction and color information of a reference color after color correction;

selecting a specific source region from each of source images photographed by a plurality of image pickup devices;

deciding a source region color as a representative color of the source region;

updating the source color of the color set by using the source region color; and correcting a color in a range similar to the source color and in the plurality of source images to the reference color by using the color set.

10. A color correction method according to claim 9, further comprising:

extracting a foreground object moving in a background image as a source object from the source image;

deciding an average color of the source object as an object color which is the source region color;

judging whether or not the source object is similar to a predetermined reference object; and updating the source color of the color set by using the object color of the source object when a judgment is made that the source object is similar to the reference object.

11. A color correction method according to claim 9, further comprising:

storing color set information containing region information from which color information of the source color is acquired;

acquiring a background image from the plurality of source images;

searching the background image for a corresponding region corresponding to region information of the source color;

deciding an average color of the corresponding region as a corresponding region color which is the source region color;

detecting a change of lighting environment in the source image based on the corresponding region color; and updating the source color of the color set by using the corresponding region color when a judgment is made that there is a change in lighting environment.

* * * * *

UNITED STATES PATENT AND TRADEMARK OFFICE
CERTIFICATE OF CORRECTION

PATENT NO.        : 8,018,494 B2
APPLICATION NO.   : 12/160151
DATED             : September 13, 2011
INVENTOR(S)       : Sumio Yokomitsu et al.

It is certified that error appears in the above-identified patent and that said Letters Patent is hereby corrected as shown below:

In column 29, line 25, please delete the word "band" and instead insert --b and--.

Signed and Sealed this
Fourteenth Day of February, 2012

David J. Kappos
*Director of the United States Patent and Trademark Office*